(12) United States Patent
Miyashita

(10) Patent No.: US 10,936,256 B2
(45) Date of Patent: Mar. 2, 2021

(54) LABEL PRODUCING APPARATUS OPERATED BY OPERATION TERMINAL

(71) Applicant: Brother Kogyo Kabushiki Kaisha, Nagoya (JP)

(72) Inventor: Tomoki Miyashita, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 147 days.

(21) Appl. No.: 16/233,975

(22) Filed: Dec. 27, 2018

(65) Prior Publication Data

US 2019/0212954 A1   Jul. 11, 2019

(30) Foreign Application Priority Data

Jan. 9, 2018   (JP) .............................. JP2018-001321

(51) Int. Cl.
   *G06F 3/12*   (2006.01)
   *H04N 1/00*   (2006.01)

(52) U.S. Cl.
   CPC .......... *G06F 3/1208* (2013.01); *G06F 3/1204* (2013.01); *G06F 3/1226* (2013.01); *G06F 3/1255* (2013.01); *G06F 3/1292* (2013.01); *H04N 1/00676* (2013.01)

(58) Field of Classification Search
   CPC .... G06F 3/1208; G06F 3/1226; G06F 3/1204; G06F 3/1292; G06F 3/1255; H04N 1/00676
   See application file for complete search history.

(56) References Cited

U.S. PATENT DOCUMENTS 6,477,589 B1   11/2002   Suzuki et al.

FOREIGN PATENT DOCUMENTS

JP      4424700 B2   3/2010

*Primary Examiner* — Eric A. Rust
(74) *Attorney, Agent, or Firm* — Banner & Witcoff, Ltd.

(57) ABSTRACT

A non-transitory computer-readable recording medium stores a communication processing program. When the program is read, a computer of a label producing apparatus executes a reception start step, machine determination step and a transmission start step. In the reception start step, reception of second state information and second performance/attribute information are started. In the machine determination step, it is determined whether any other label producing apparatus superior with respect to a label producing condition is present or not. In the transmission start step, in the case that any other label producing apparatus superior is present, broadcast transmission of the first state information and the first performance/attribute information is disabled. In the case that no other label producing apparatus superior is present, the broadcast transmission is performed.

11 Claims, 15 Drawing Sheets

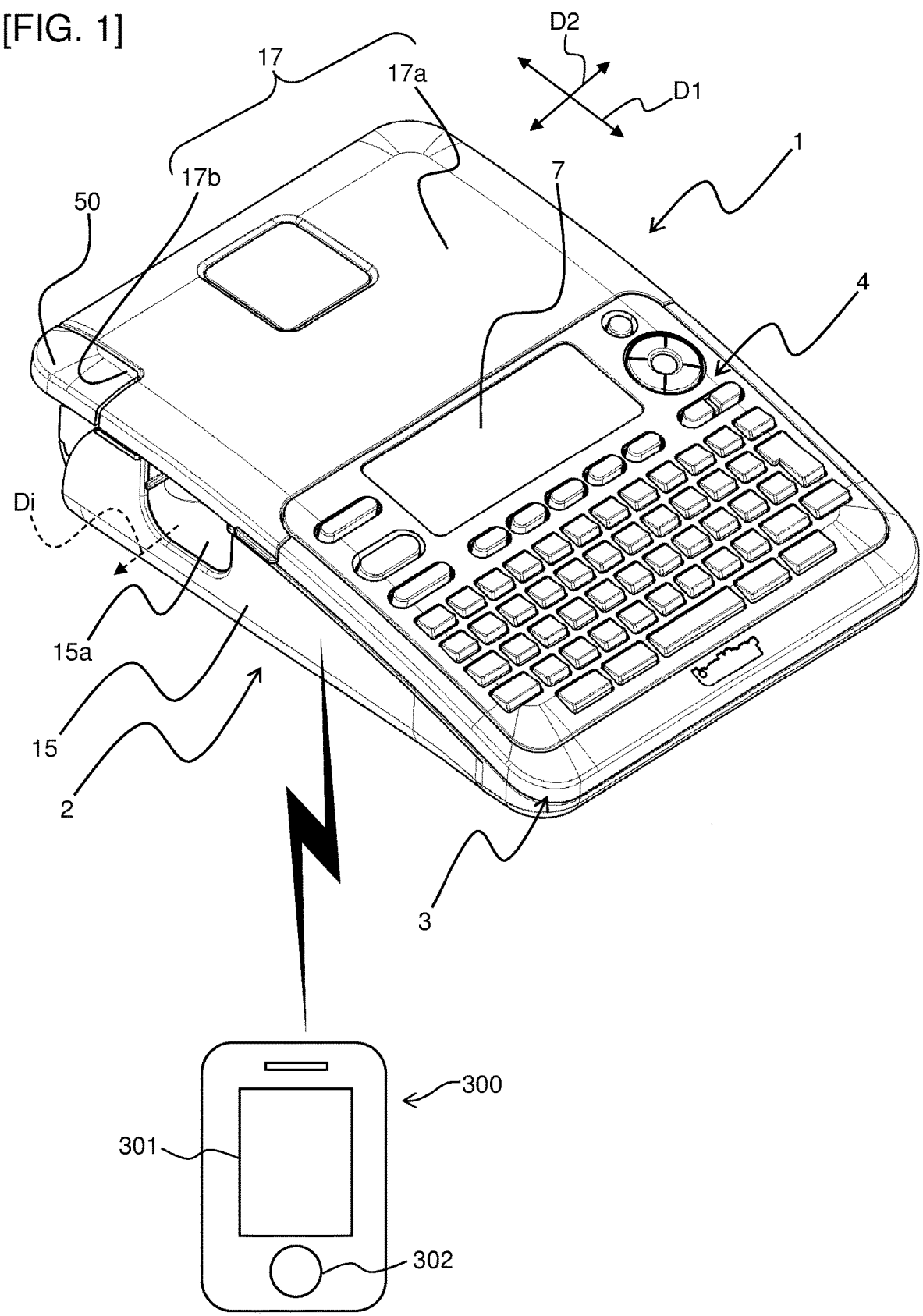
[FIG. 1]

[FIG. 2]
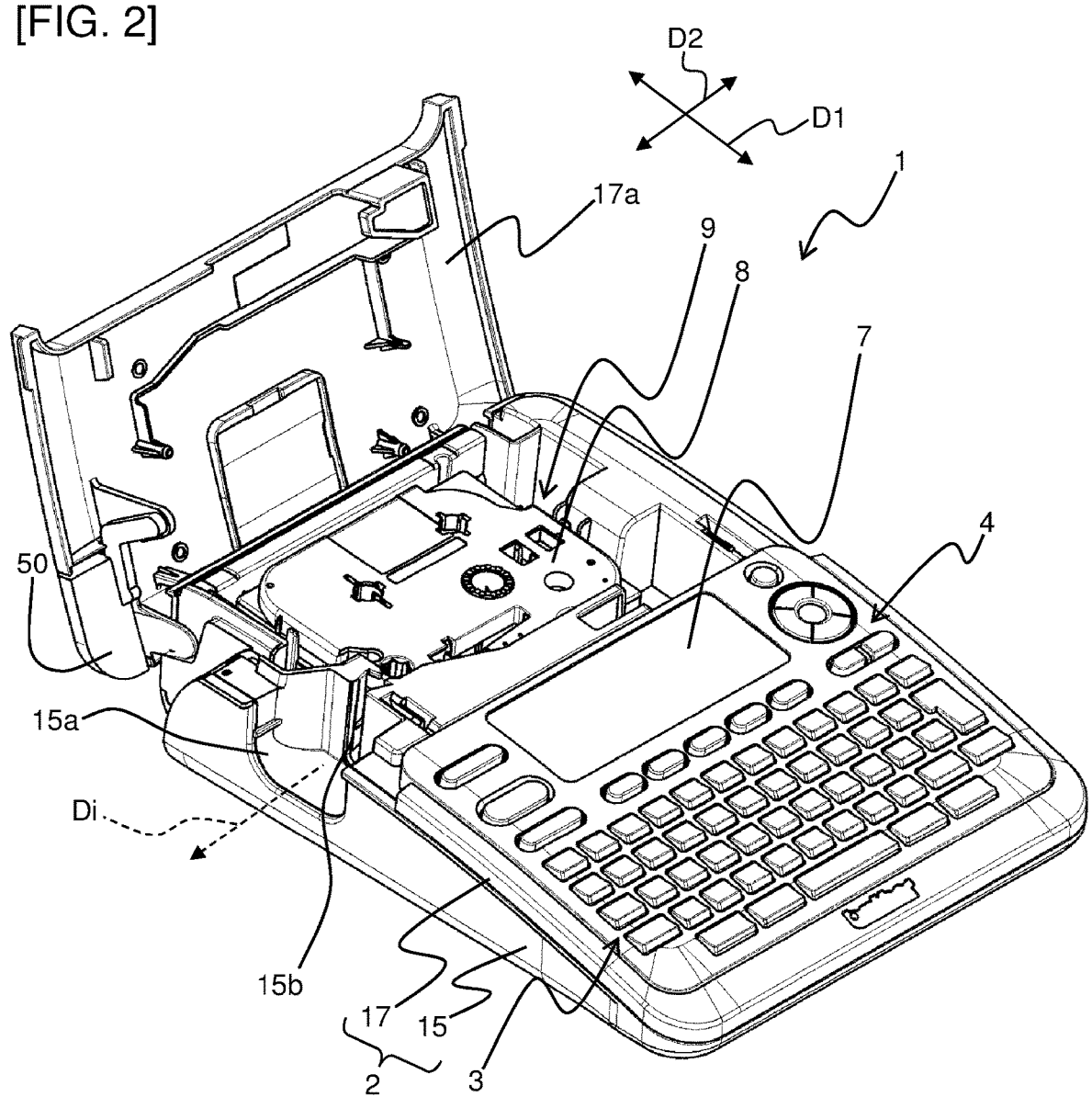

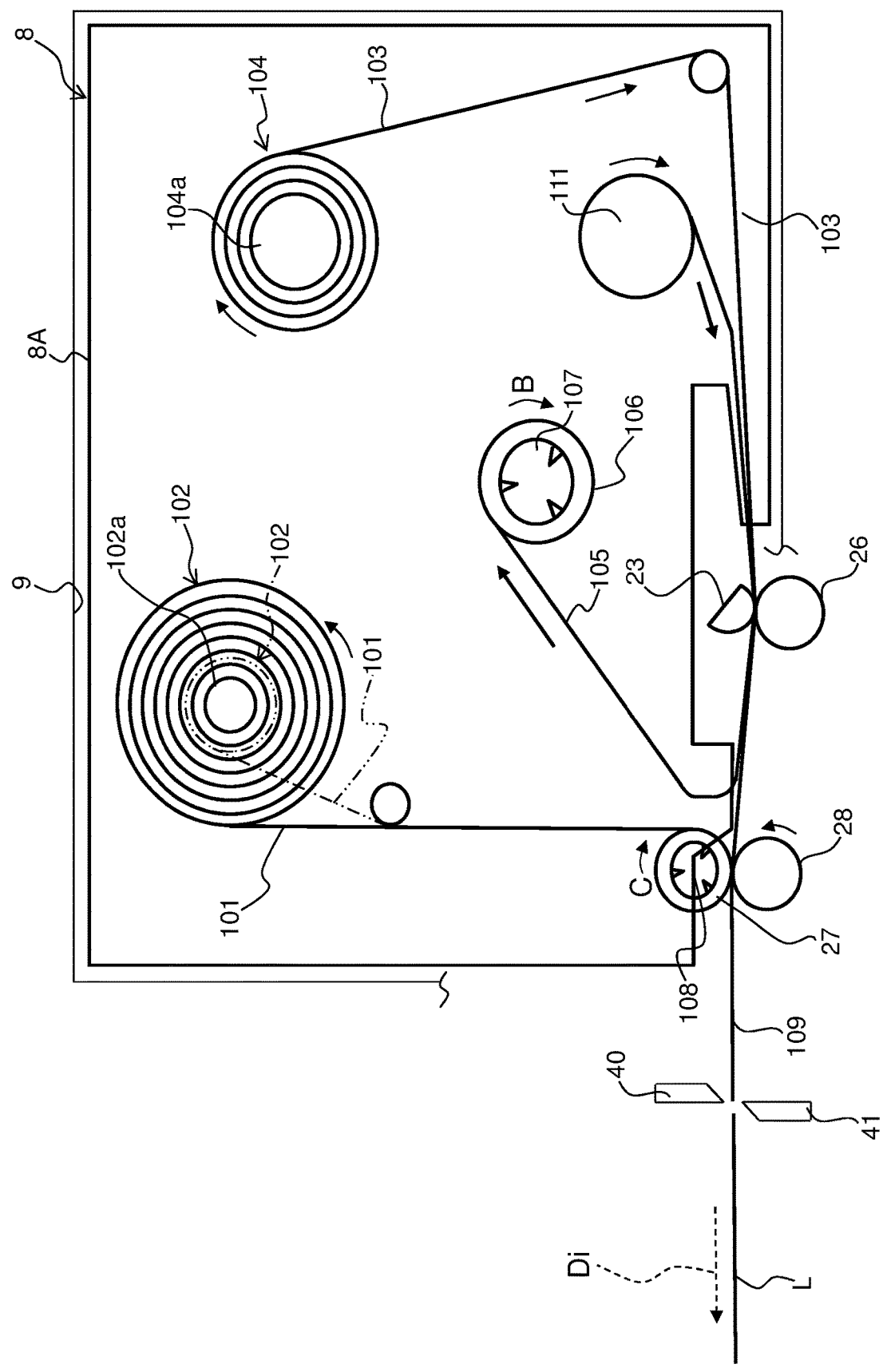

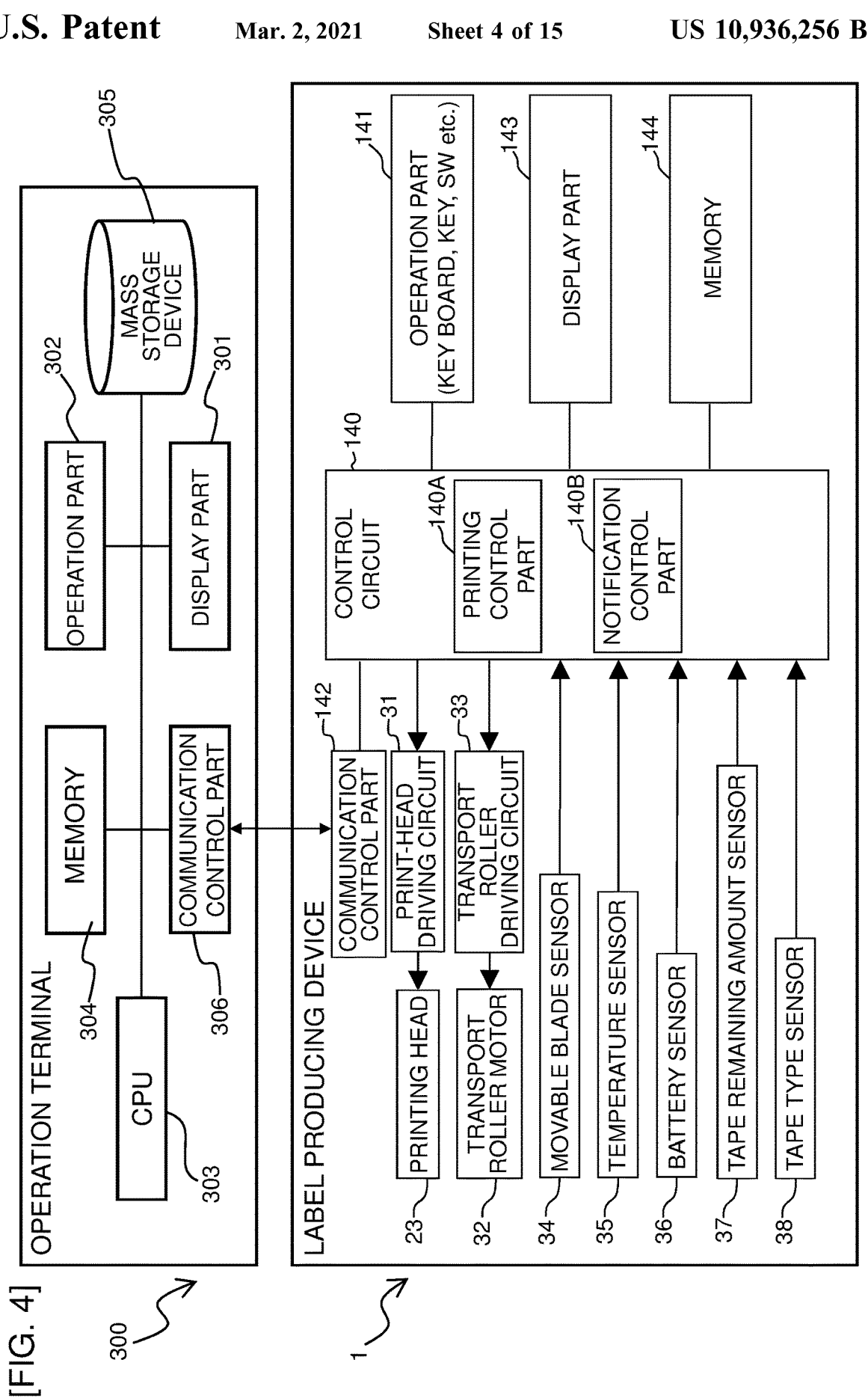
[FIG. 4]

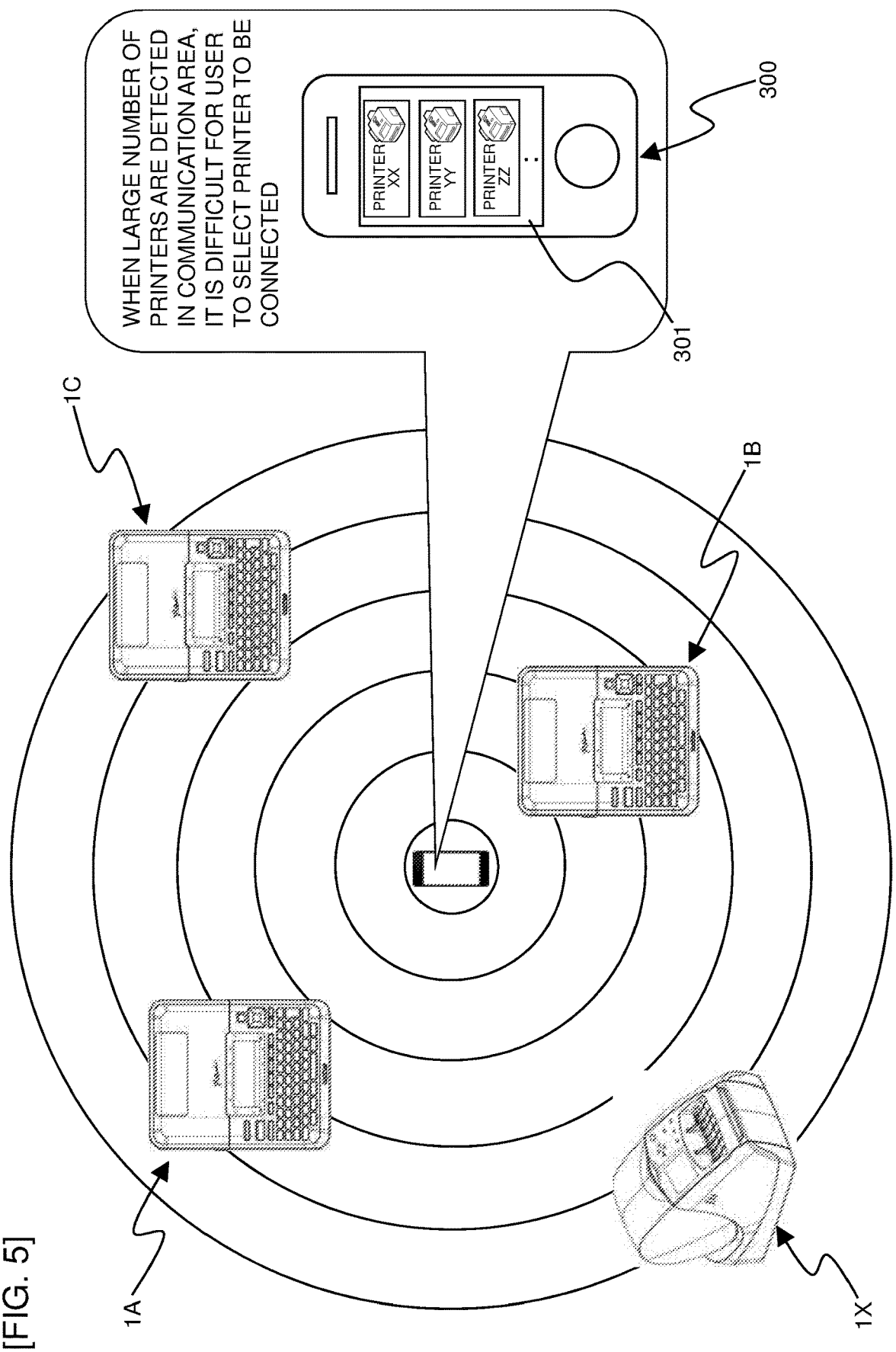
[FIG. 5]

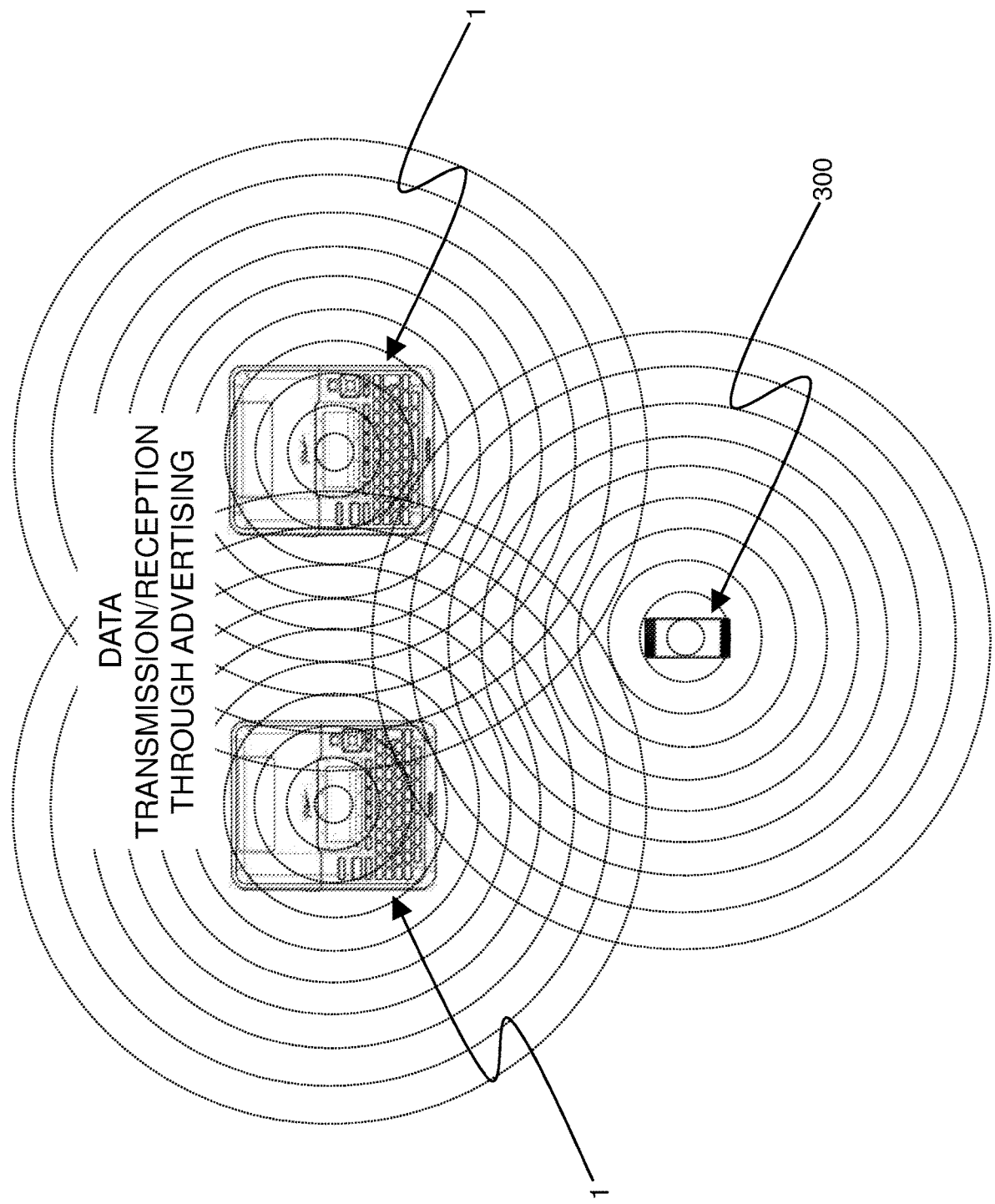
[FIG. 6]

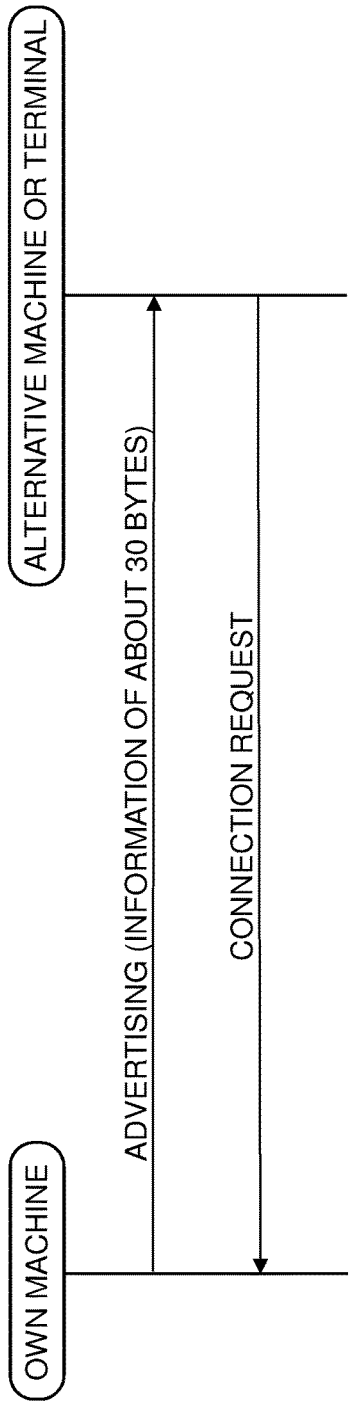
[FIG. 7A]
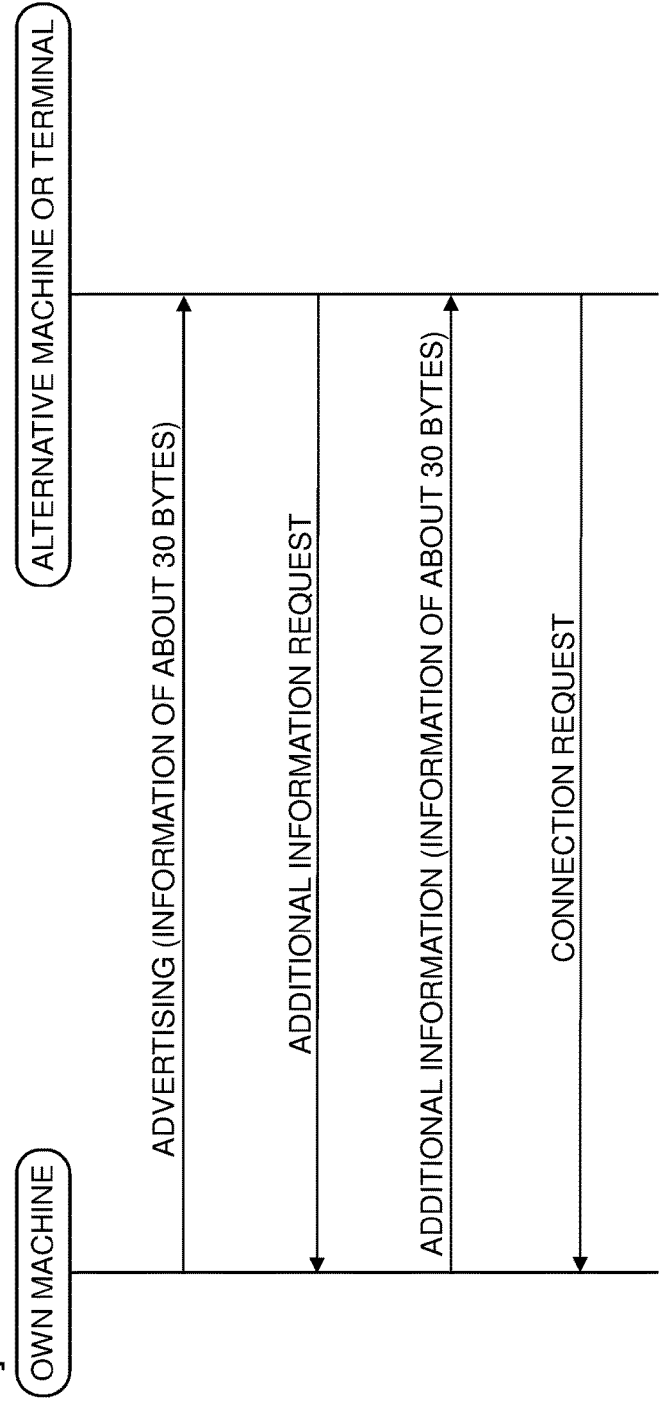
[FIG. 7B]

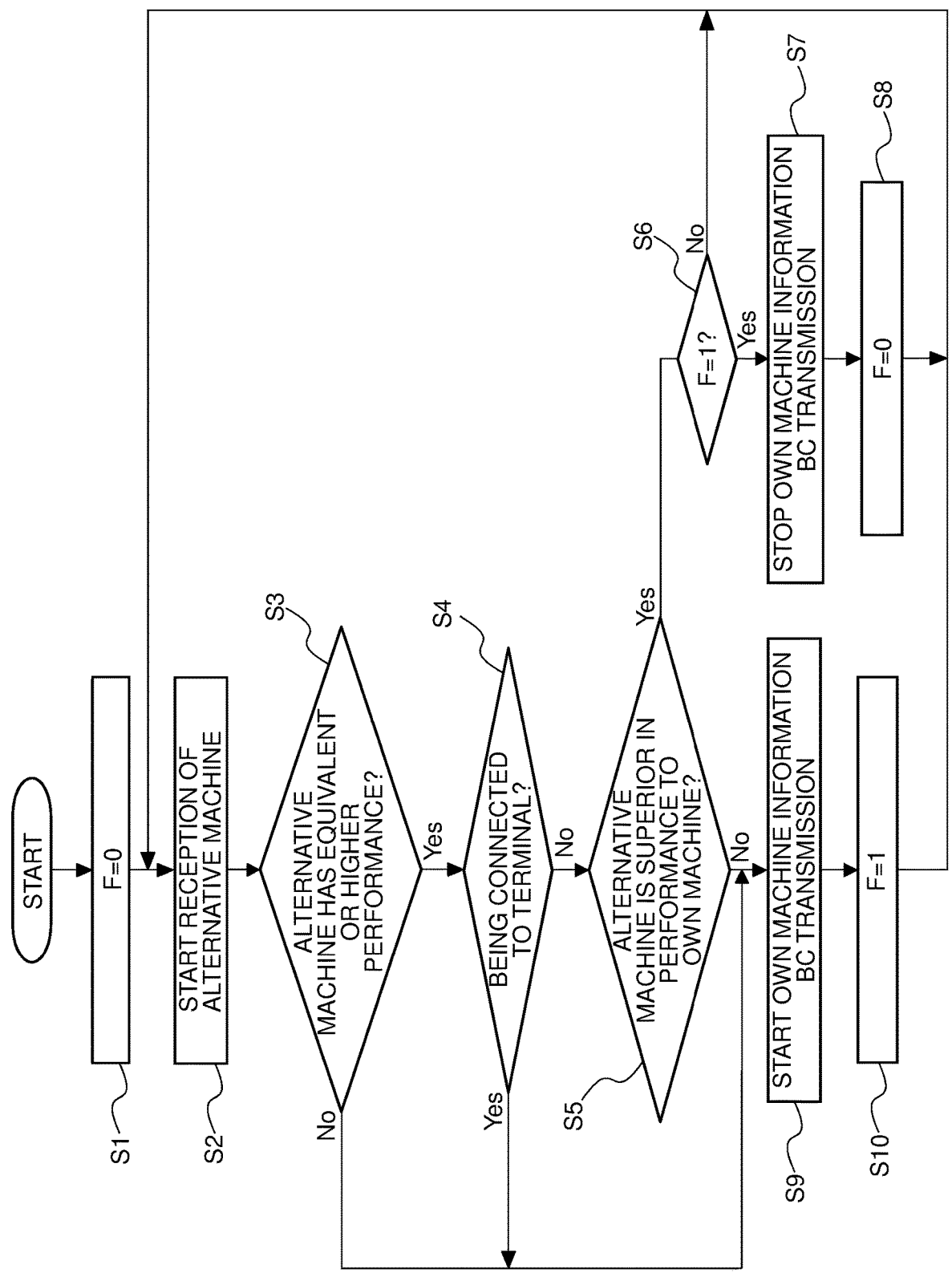
[FIG. 8]

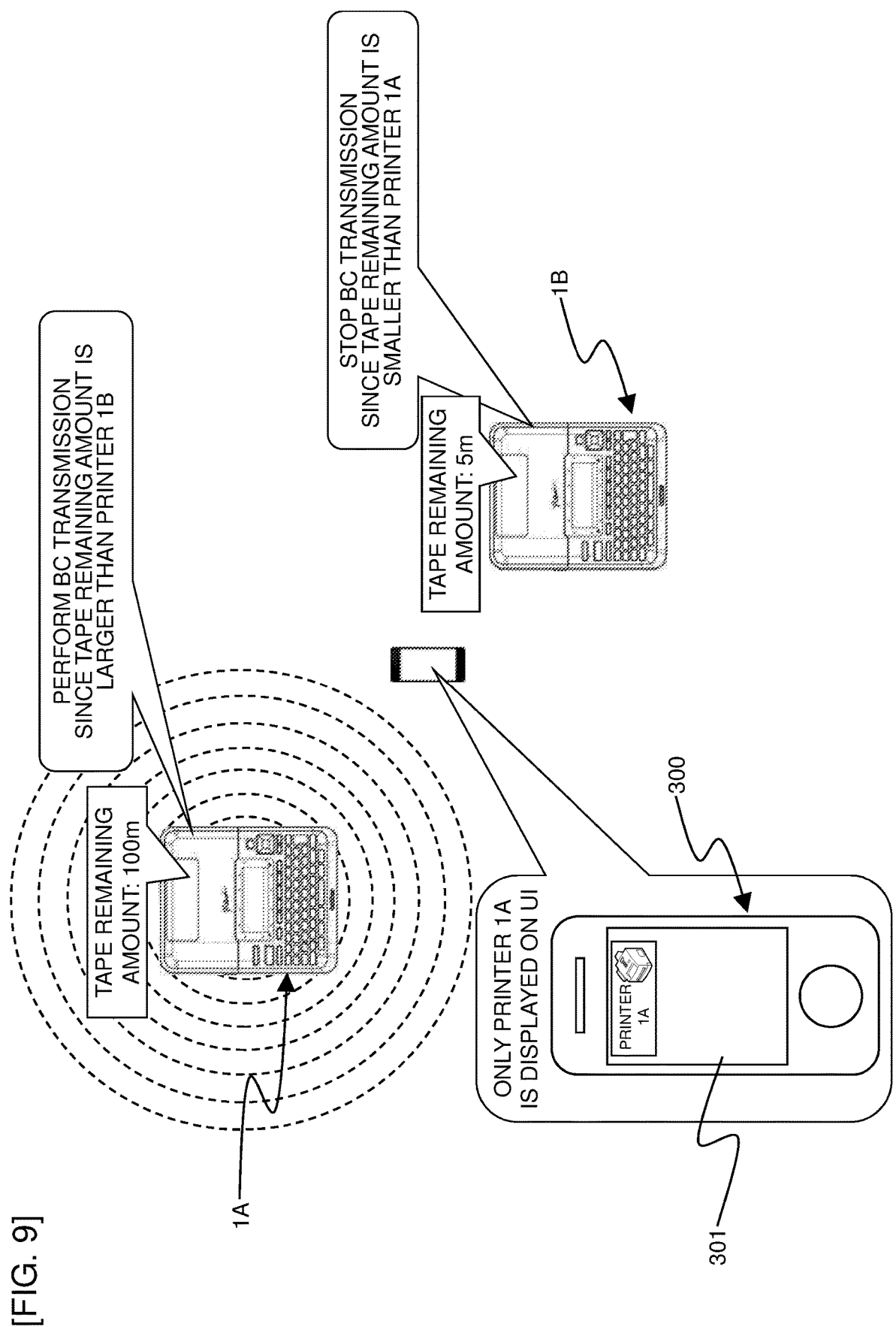

[FIG. 10]
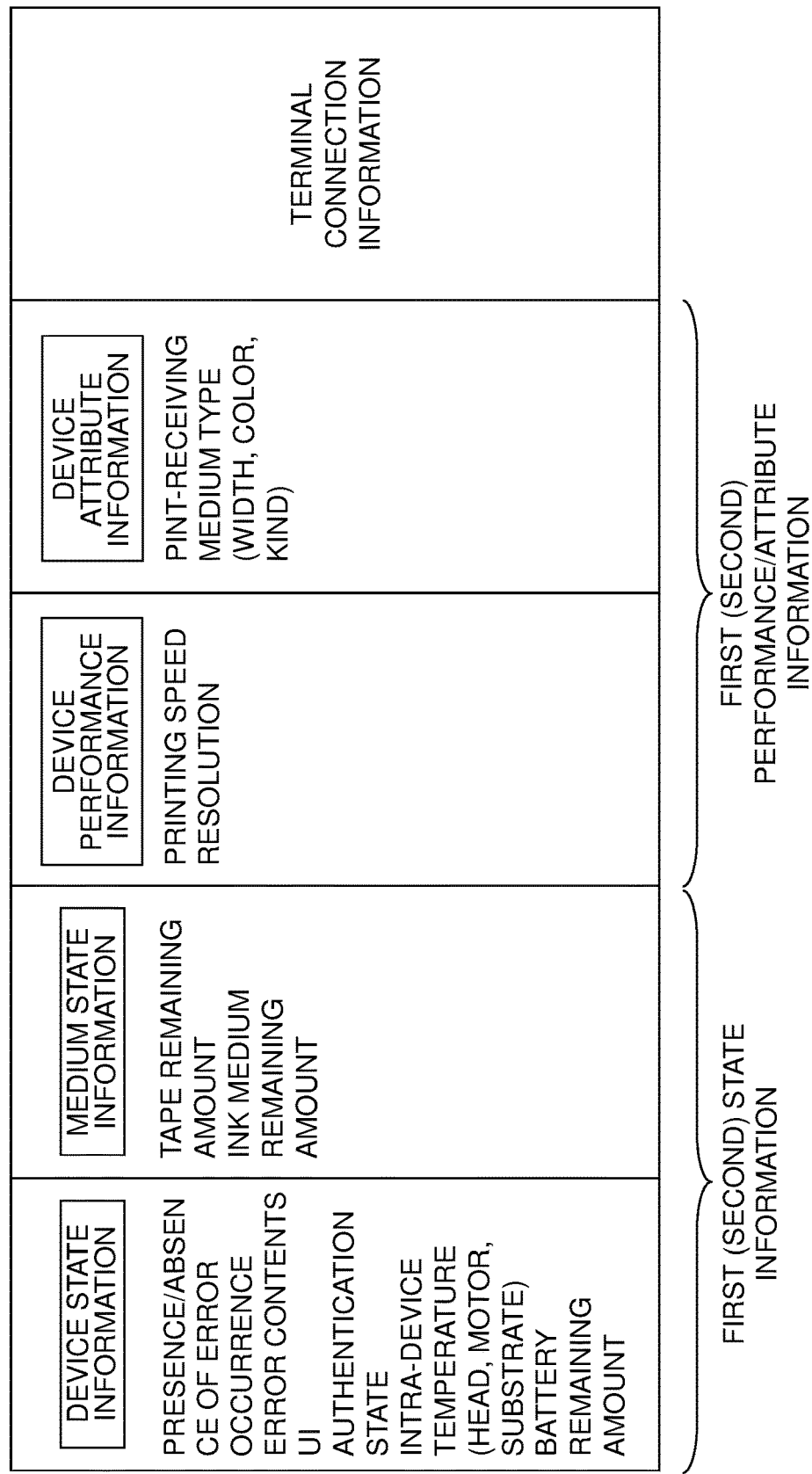

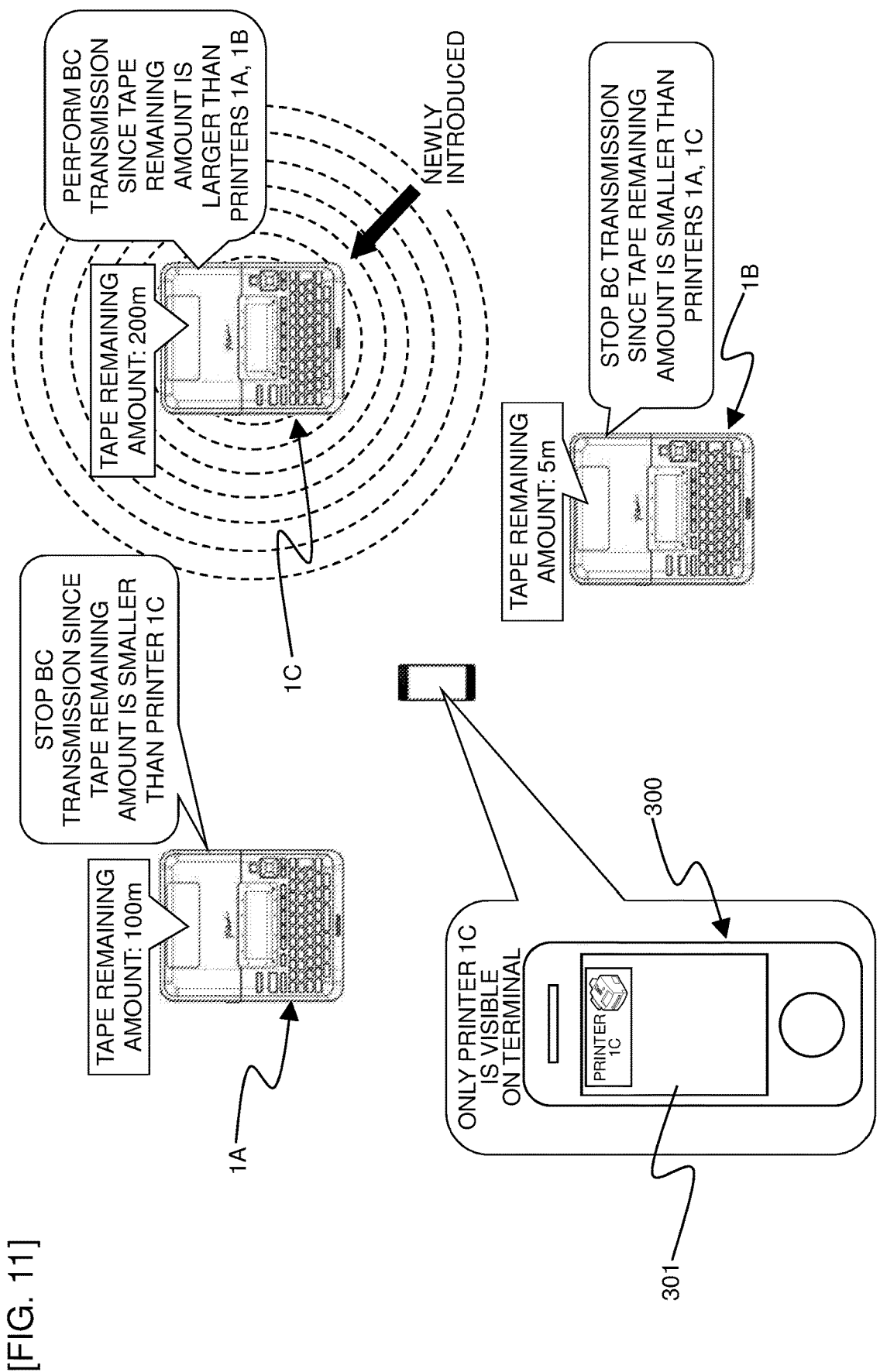

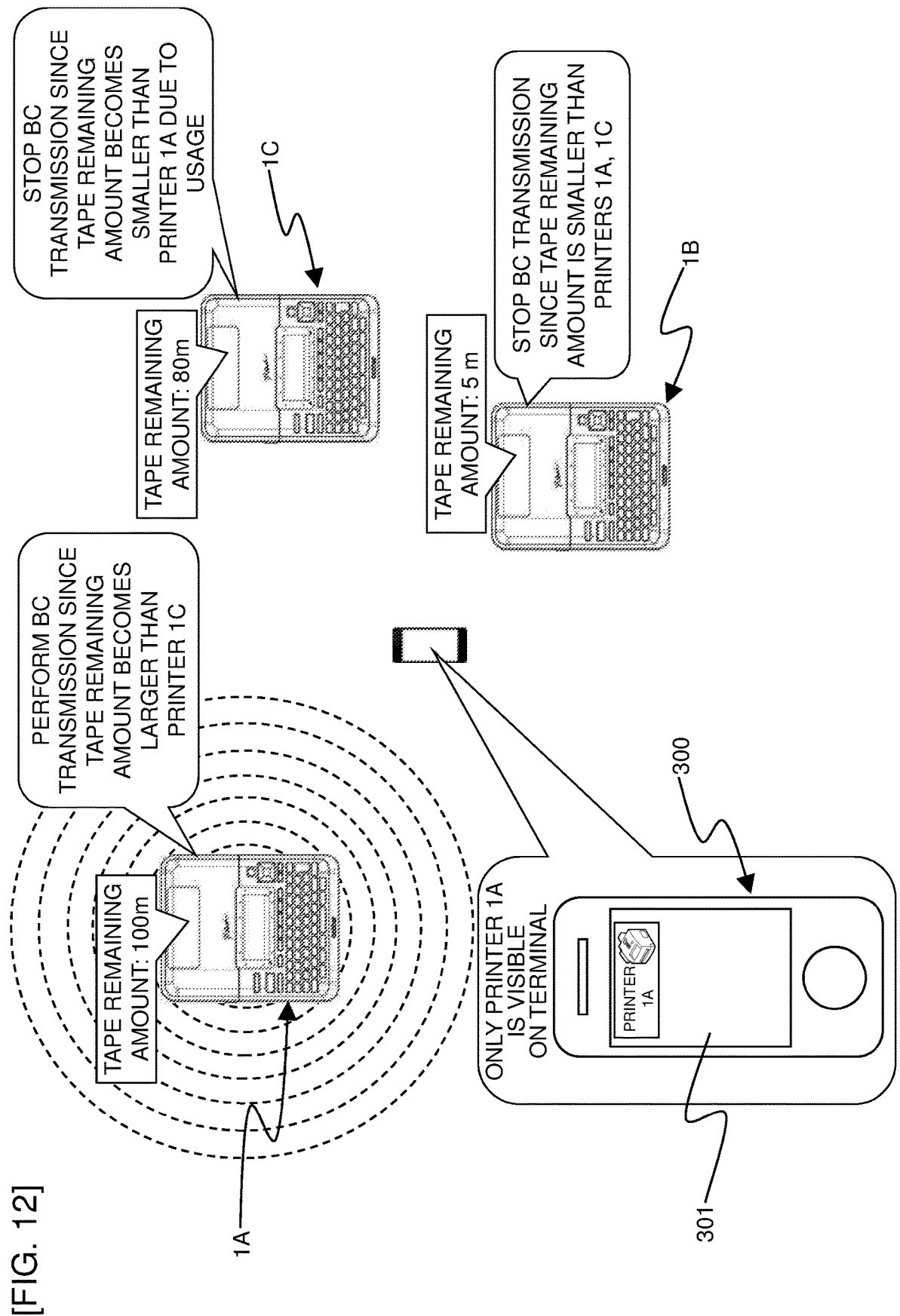
[FIG. 12]

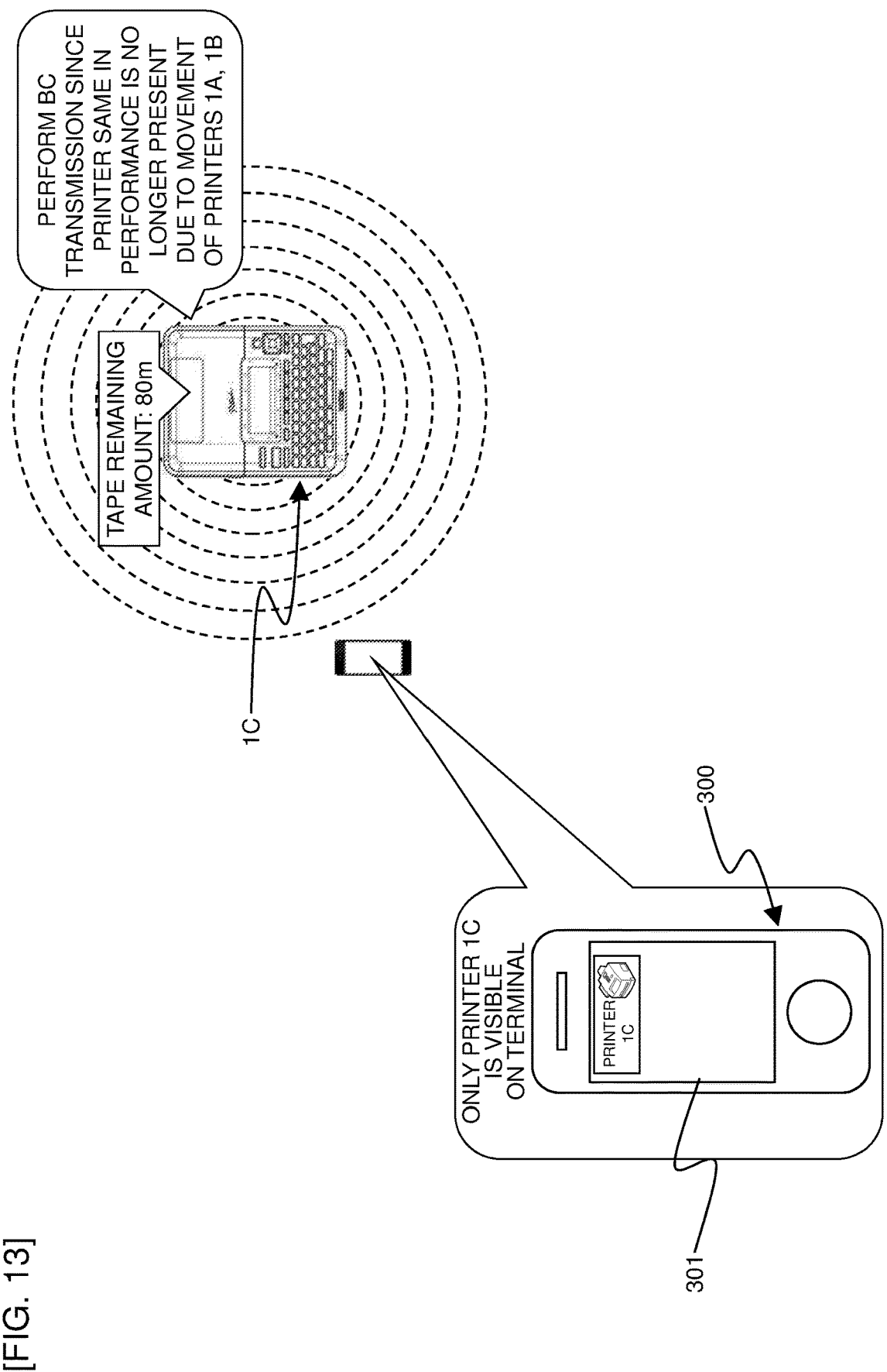

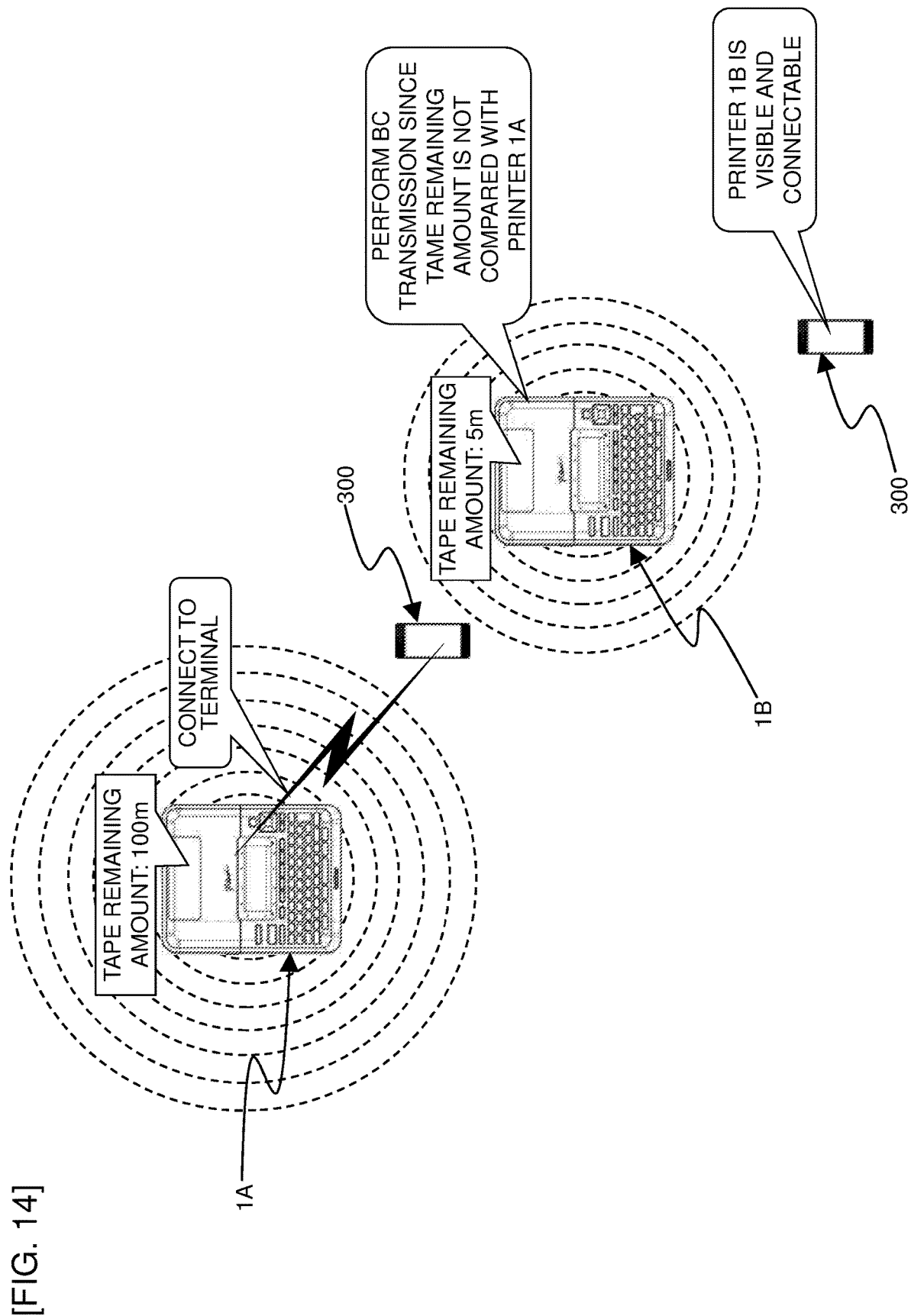
[FIG. 14]

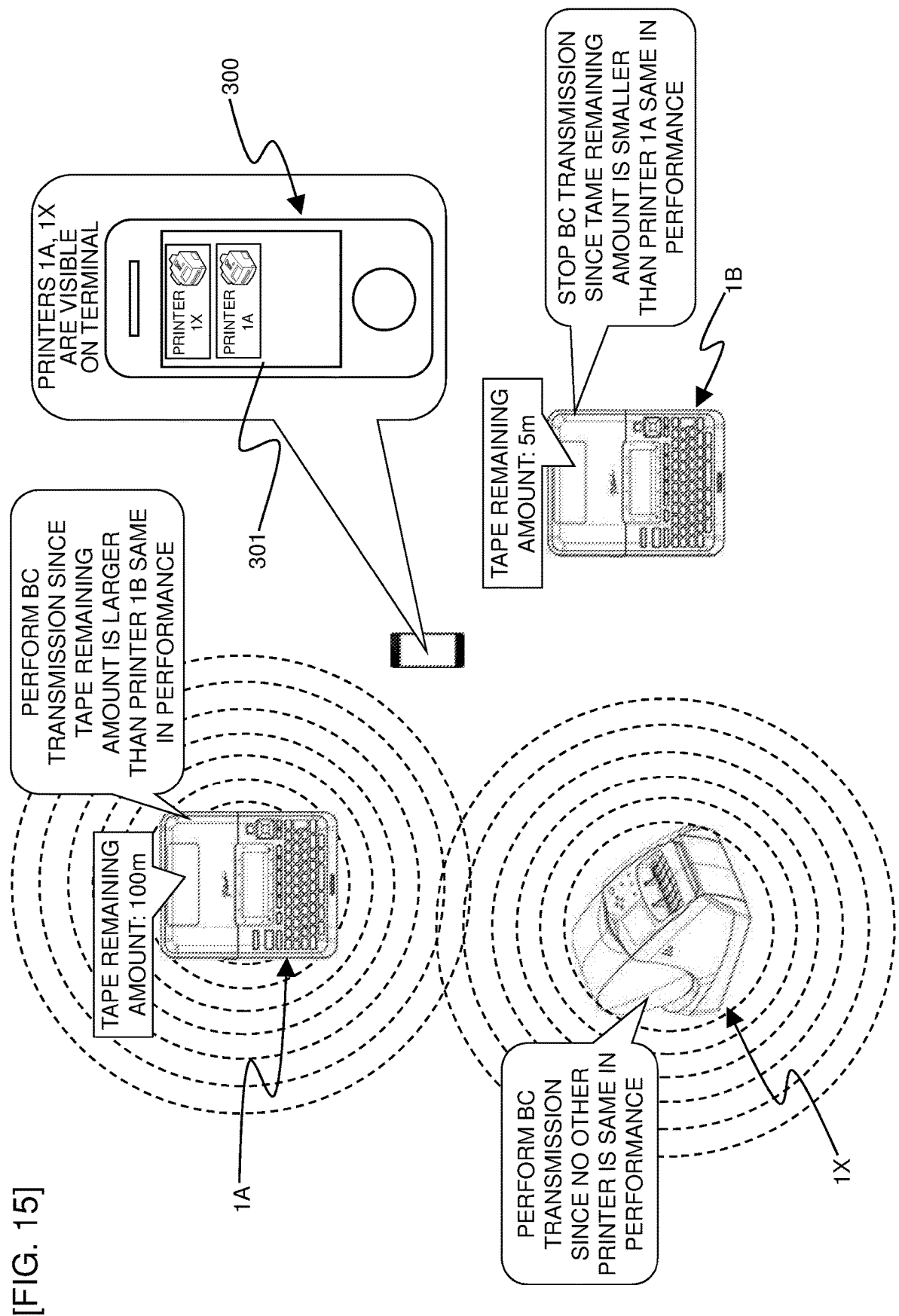

LABEL PRODUCING APPARATUS OPERATED BY OPERATION TERMINAL

CROSS-REFERENCE TO RELATED APPLICATION

The present application claims priority from Japanese Patent Application No. 2018-001321, which was filed on Jan. 9, 2018, the disclosure of which is incorporated herein by reference in its entirety.

BACKGROUND

Field

The present disclosure relates to a recording medium storing a communication processing program of a label producing apparatus operated by using an operation terminal to produce a print label, and a label producing apparatus.

Description of the Related Art

In a network environment in which multiple apparatuses can be connected to an operation terminal, apparatus information is acquired from each of the apparatuses by the operation terminal to search for a desired apparatus, and one or more found apparatuses can be displayed on the operation terminal in an easily recognizable manner for a user in a known technique. As a result, the user can easily select the apparatus in accordance with a use application.

In the prior art, apparatus information is acquired from multiple apparatuses via a network, and only the apparatuses satisfying a search condition are displayed.

However, in the case that multiple apparatuses satisfy the condition, the user cannot know which apparatus should appropriately be selected. Therefore, an apparatus in an insufficient state (e.g., an apparatus having an insufficient battery remaining amount) may be selected. Additionally, in the case of wireless communication, a problem of deterioration in communication situation occurs as the number of connected apparatuses increases.

SUMMARY

An object of the present disclosure is to provide a recording medium storing a communication processing program of a label producing apparatus capable of solving the problem of difficulty in selecting a label producing apparatus to be connected and easily establishing wireless connection to one label producing apparatus having high superiority, and a label producing apparatus.

In order to achieve the above-described object, according to the first aspect of the present application, there is provided a non-transitory computer-readable recording medium capable of reading by a computer of a label producing apparatus, storing a communication processing program of the label producing apparatus for executing steps on the computer provided the label producing apparatus, the label producing apparatus that includes a feeder configured to feed a print-receiving medium, a printing head configured to perform print on the print-receiving tape fed by the feeder, a communication device, and the computer and is configured to be operated by an operation terminal through wireless communication via the communication device to produce a print label, the steps comprising a reception start step for starting reception of second state information and second performance/attribute information that are broadcast-transmitted from the other label producing apparatus through the communication device, the second state information including second apparatus state information related to the other label producing apparatus and second medium state information of the corresponding print-receiving medium, the second performance/attribute information including second apparatus performance information related to the other label producing apparatus and second medium attribute information of the corresponding print-receiving medium, other machine determination step for determining whether or not any other label producing apparatus superior with respect to a label producing condition to the label producing apparatus is present, on the basis of the second performance/attribute information of the other label producing apparatus, first state information, and first performance/attribute information, the second performance/attribute information being acquired through the reception started in the reception start step, the first state information including first apparatus state information related to the label producing apparatus and first medium state information of the print-receiving medium, the first performance/attribute information including first apparatus performance information related to the label producing apparatus and first medium attribute information of the print-receiving medium, and a transmission start step for, in the case it is determined in the other machine determination step that the any other label producing apparatus superior with respect to the label producing condition is present, disabling broadcast transmission of the first state information and the first performance/attribute information through the communication device, and for, in the case that it is determined in the other machine determination step that no other label producing apparatus superior with respect to the label producing condition is present, performing the broadcast transmission of the first state information and the first performance/attribute information through the communication device.

In the case that the multiple label producing apparatuses are wirelessly connectable to the operation terminal in the configuration in which any of the label producing apparatuses is operated by the operation terminal through wireless communication, it is difficult to quickly select the label producing apparatus to be connected.

Therefore, in the present disclosure, when the communication processing program is executed in the label producing apparatuses, the reception start step, the other machine determination step, and the transmission start step are performed.

Specifically, the reception start step includes starting reception of state information (the second state information. including the second apparatus state information and the second medium state information as described above) and performance/attribute information (the second performance/attribute information. including the second apparatus performance information and the second medium attribute information as described above) broadcast-transmitted from other machine.

Subsequently, in the other machine determination step after the reception start step, it is determined, on the basis of comparison of the received second state information and second performance/attribute information with the state information (the first state information) and the performance/attribute information (the first performance/attribute information) of the label producing apparatus (hereinafter appropriately referred to as "own machine"), whether or not any other label producing apparatus is superior in label producing condition to the own machine (=has the contents of the performance/attribute information equal to or higher than the own machine and the contents of the state information superior to the own machine). The first performance/attribute information includes the apparatus performance information indicative of apparatus performance (the first apparatus performance information. for example, printing speed, printing resolution), and medium attribute information indicative of the attribute of the print-receiving medium to be used (the first medium attribute information. for example, the type of the print-receiving medium). The first state information includes the apparatus state information indicative of an apparatus state (the first apparatus state information. for example, the presence/absence of error occurrence and the error contents at the time of error occurrence, a user interface setting state, an intra-apparatus temperature, a battery remaining amount in the case of battery drive), and the medium state information indicative of a state of the print-receiving medium (the first medium state information. the remaining amount of the print-receiving medium, a remaining amount of an ink medium including an ink transferred to the print-receiving medium, etc.).

If no other label producing apparatus is superior in label producing condition to the own machine in the other machine determination step, the transmission start step is subsequently executed to perform the broadcast transmission of the first state information and the first performance/attribute information through the communication device. In contrast, if any other label producing apparatus is superior in label producing condition to the own machine, the broadcast transmission of the first state information and the first performance/attribute information through the communication device is not performed (is disabled).

When these steps are executed by, for example, the multiple label producing apparatuses at the same time, the broadcast transmission is not performed by the label producing apparatus having at least one other machine superior in label producing condition to the own machine among the multiple label producing apparatuses 1, and the broadcast transmission is performed only by the one label producing apparatus superior in label producing condition of the own machine to any other machines. As a result, the operation terminal recognizes only the one label producing apparatus performing the broadcast transmission (as a connectable apparatus). Therefore, the problem of difficulty in selecting the label producing apparatus to be connected as described above is solved, and wireless connection can easily be established for the one label producing apparatus.

Further, in order to achieve the above-described object, according to the second aspect of the present application, there is provided a label producing apparatus comprising a feeder configured to feed a print-receiving medium a printing head configured to perform print on the print-receiving tape fed by the feeder a communication device configured to perform wireless communication, and a controller, the label producing apparatus configured to be operated by an operation terminal to produce a print label, the controller executing a reception start process for starting reception of second state information and second performance/attribute information that are broadcast-transmitted from the other label producing apparatus through the communication device, the second state information including second apparatus state information related to the other label producing apparatus and second medium state information of the corresponding print-receiving medium, the second performance/attribute information including second apparatus performance information related to the other label producing apparatus and second medium attribute information of the corresponding print-receiving medium, other machine determination process for determining whether or not any other label producing apparatus superior with respect to a label producing condition to the label producing apparatus is present, on the basis of the second performance/attribute information of the other label producing apparatus, first state information, and first performance/attribute information, the second performance/attribute information being acquired through the reception started in the reception start process, the first state information including first apparatus state information related to the label producing apparatus and first medium state information of the print-receiving medium, the first performance/attribute information including first apparatus performance information related to the label producing apparatus and first medium attribute information of the print-receiving medium, and a transmission start process for, in the case that it is determined in the other machine determination process that the any other label producing apparatus superior with respect to the label producing condition is present, disabling broadcast transmission of the first state information and the first performance/attribute information through the communication device, and for, in the case that it is determined in the other machine determination process that no other label producing apparatus superior with respect to the label producing condition is present, performing the broadcast transmission of the first state information and the first performance/attribute information through the communication device.

BRIEF DESCRIPTION OF THE DRAWINGS

FIG. 1 is a view showing a label producing apparatus to which an embodiment of the present disclosure is applied, along with an operation terminal.

FIG. 2 is a perspective view showing an exterior appearance of the label producing apparatus with a cartridge cover opened.

FIG. 3 is a conceptual plane view of an internal structure of a cartridge.

FIG. 4 is a block diagram of functional configurations of the label producing apparatus and the operation terminal.

FIG. 5 is an explanatory view showing a relationship between broadcast communication and a UI menu display state.

FIG. 6 is an explanatory view showing a relationship a state of mutual communication through advertising.

FIG. 7A is a sequence diagram of processes showing a data transmission/reception relationship between an own machine and other machine or the terminal.

FIG. 7B is a sequence diagram of processes showing a data transmission/reception relationship between the own machine and other machine or the terminal.

FIG. 8 is a flowchart of an example of a routine executed by a control circuit of a label producing apparatus.

FIG. 9 is an explanatory view in the case that one label producing apparatus having a higher superiority is displayed on a UI menu on the operation terminal when two label producing apparatuses are present.

FIG. 10 is an explanatory diagram of an example of a data format included in transmission information of the label producing apparatus.

FIG. 11 is an explanatory view in the case that a label producing apparatus having the highest superiority is displayed on the UI menu on the operation terminal when other machine is newly added while two label producing apparatuses are present.

FIG. 12 is an explanatory view in the case that one label producing apparatus having the highest superiority is displayed on the UI menu on the operation terminal when the superiority is inversed due to use.

FIG. 13 is an explanatory view in the case that the label producing apparatus having the highest superiority is displayed on the UI menu on the operation terminal when the own machine etc. go out of an area.

FIG. 14 is an explanatory view in the case that one label producing apparatus having the highest superiority is displayed on the UI menu on the operation terminal when a connected label producing apparatus is excluded from comparison objects.

FIG. 15 is an explanatory view in the case that two label producing apparatuses having high superiority are displayed on the UI menu on the operation terminal when label producing apparatuses of different models are present.

DETAILED DESCRIPTION OF THE PREFERRED EMBODIMENTS

An embodiment of the present disclosure will now be described with reference to the drawings. Constituent elements of the shown embodiment are appropriately scaled to facilitate understanding of the present disclosure.
<System Configuration>

In FIG. 1, an operation terminal 300 can be network-connected through a built-in antenna to one or more label producing apparatuses (only one is shown in FIG. 1) 1 by a well-known mutually recognizable wireless communication method (e.g., Bluetooth Low Energy (registered trademark)).

In this case, as described in detail later, the types etc. of the multiple label producing apparatuses 1 associated by network connection may not be the same. As a result, the operation terminal 300 can cause the (desired) label producing apparatus 1 to perform printing (also referred to as "print") by using printing data including characters etc. produced by a preliminarily installed application, for example. The printing data for printing may be transmitted and received between the operation terminal 300 and the one or more label producing apparatuses 1 by using a wireless communication method other than Bluetooth Low Energy (registered trademark).

The (multiple) label producing apparatuses 1 and the operation terminal 300 enables broadcasting (hereinafter also simply referred to as "BC" and the same applies to the drawings) for transmitting data to all apparatuses capable of participating in the network using the same wireless communication method.

As a result, the multiple label producing apparatuses 1 can perform advertising for periodically transmitting information necessary for network management (hereinafter also referred to as "network management information"). In the following description, the advertising for periodically transmitting network management information is included in and collectively referred to as the broadcasting for transmitting data to all apparatuses capable of participating in the network. Additionally, the operation terminal 300 can receive the data broadcast-transmitted from the (multiple) label producing apparatuses 1 to recognize, i.e., associate, the connectable label producing apparatuses 1.

The operation terminal 300 is, for example, a personal digital assistance (hereinafter also abbreviated as "PDA") having a wireless communication function or a smartphone (a mobile phone terminal having a PDA function). The operation terminal 300 has, for example, a liquid crystal display 301 and an operation button 302. The liquid crystal display 301 has a display function of displaying various pieces of information and messages and enables a user to input desired instructions and information by using a touch panel method etc. in combination with the operation button 302. Therefore, hereinafter, the display function of the liquid crystal display 301 is referred to as a "display part 301", and an operational function of a touch panel and an operational function of the operation button 302 are collectively simply referred to as an "operation part 302".
<Configuration of Label Producing Apparatus>

The label producing apparatus 1 will be described. As shown in FIGS. 1 and 2, the label producing apparatus 1 includes a housing 2 constituting the outer contour thereof. The housing 2 includes a resin lower cover 15 constituting an apparatus lower surface and integrated with apparatus side surfaces as well as a resin upper cover 17 constituting an apparatus upper surface.

A side surface of the lower cover 15 includes a recess 15b and a discharging exit 15a formed at the center on the innermost side of the recess 15a to discharge a label tape 109 with print (see FIG. 3 described later).

The upper cover 17 comprises, from the front side toward the rear side, a keyboard 3 for performing various operations such as character input, functional keys 4 such as a power switch and a printing key, for causing the label producing apparatus 1 to perform various functions, and a transparent panel 7 mounted to close an opening portion having a rectangular opening shape, for example.

The upper cover 17 includes a lid-shaped cartridge cover 17a that is configured to be openable for mounting a tape cassette-shaped cartridge 8 on the upper surface rear portion side and that opens and closes a cartridge holder 9. This cartridge cover 17a has a cutout part 17b provided on an end portion in a direction D1 (see FIG. 1) orthogonal to a direction Di (see FIG. 1) of a tape transport path in the vicinity of the discharging exit 15a and in a direction D2 (see FIG. 1) orthogonal thereto. A cut lever 50 serving as an operation lever for cutting the label tape 109 with print is provided such that the cut lever 50 is received in the cutout part 17b.

The label producing apparatus 1 has the cartridge holder 9 provided on the upper surface rear portion side thereof such that the cartridge 8 can be attached and detached. This cartridge holder 9 is always closed by the cartridge cover 17a (see FIG. 1) and, when the cartridge cover 17a is opened, the cartridge holder 9 is exposed (see FIG. 2).

Detailed structures of the cartridge 8 and the cartridge holder 9 will be described with reference to FIG. 3. The cartridge 8 has a housing 8A, a first roll 102 (actually having a spiral shape and simplified into a concentrically circular shape in FIG. 3) having a wound belt-shaped base tape 101 located in the housing 8A, a second roll 104 (actually having a spiral shape and simplified into a concentrically circular shape in FIG. 3) having a wound transparent print-receiving tape 103 with substantially the same width as the base tape 101, a ribbon supply side roll 111 feeding out an ink ribbon 105 (not necessary in the case that the print-receiving tape is a thermal tape), a ribbon take-up roller 106 taking up the ink ribbon 105 after print, and a feeding roller 27 rotatably supported in the vicinity of a tape discharging part of the cartridge 8. In the following description and the figures, the print-receiving tape 103 is also simply referred to as a "tape", and the ink ribbon 105 is also simply referred to as a "ribbon".

The first roll 102 has the base tape 101 wound around a reel member 102a. The base tape 101 includes, for example, a bonding adhesive layer, a base film, an affixing adhesive layer, and a separation sheet laminated in this order from the inner wound side toward the opposite side. The second roll 104 has the print-receiving tape 103 wound around a reel member 104a.

The feeding roller 27 feeds the base tape 101 and the print-receiving tape 103 in the direction Di described above while pressing and bonding the tapes into the label tape 109 with print.

On the downstream side of the feeding roller 27 and a pressure roller 28 along the transport path of the label tape 109 with print (i.e., on the downstream side of a printing head 23 described later), a fixed blade 40 is provided along with a movable blade 41 advancing toward the fixed blade 40 in accordance with a manual operation of the cut lever 50 to cut the label tape 109 with print in a thickness direction in cooperation with the fixed blade 40.

On the other hand, the cartridge holder 9 comprises a ribbon take-up roller driving shaft 107 for taking up the ink ribbon 105 used in the cartridge 8, and a feeding roller driving shaft 108 (corresponding to a feeder) feeding the label tape 109 with print. The ribbon take-up roller 106 and the feeding roller 27 described above are rotationally driven in conjunction with each other by transmitting a drive force of a feeding motor not shown to the ribbon take-up roller driving shaft 107 and the feeding roller driving shaft 108. The printing head 23 performing desired printing on the fed print-receiving tape 103 is provided on the cartridge holder 9 and is positioned at an opening portion of the mounted cartridge 8. The printing head 23 is located away from the movable blade 41 and the fixed blade 40 at a predetermined separation distance La along the tape transport path (see FIG. 5 etc. described later). The printing head 23 is also simply referred to as a "head" in the following description and the figures.

<General Operation of Producing Print Tape>

When the cartridge 8 is mounted on the cartridge holder 9 in the above configuration, the print-receiving tape 103 and the ink ribbon 105 are interposed between the printing head 23 and a platen roller 26 facing thereto. The base tape 101 and the print-receiving tape 103 are interposed between the feeding roller 27 and the pressure roller 28 facing thereto. The ribbon take-up roller 106 and the feeding roller 27 are then rotationally driven in a synchronized manner in respective directions indicated by arrows B and C in FIG. 3. As a result, the feeding roller 27, the pressure roller 28, and the platen roller 26 are rotated, and the base tape 101 is fed out from the first roll 102 and supplied to the feeding roller 27. On the other hand, the print-receiving tape 103 is fed out from the second roll 104 and a print-head driving circuit 31 (see FIG. 4 described later) energizes multiple heat generation elements of the printing head 23. As a result, a print is printed on a back surface of the print-receiving tape 103.

The base tape 101 and the print-receiving tape 103 after the printing are bonded and integrated by the feeding roller 27 and the pressure roller 28 into the label tape 109 with print, which is fed outside the cartridge 8 from the tape discharging part. The ink ribbon 105 after printing to the print-receiving tape 103 is taken up by the ribbon take-up roller 106 driven by the ribbon take-up roller driving shaft 107.

The label tape 109 with print fed outside the cartridge 8 as described above is cut by the fixed blade 40 and the movable blade 41 cooperating with each other based on a manual operation of the cut lever 50, and a print label L is generated. Since the label tape 109 with print includes the print-receiving tape 103 after printing as described above, the fixed blade 40 and the movable blade 41 fulfill a function of cutting the print-receiving tape 103 after printing. As described above, the cutting in this case is achieved by transmitting the manual operation of the cut lever 50 by a user via a mechanism not shown to the movable blade 41 and causing the movable blade 41 to advance toward the fixed blade 40 so that the movable blade 41 and the fixed blade 40 are closed like scissors.

<Functional Configurations of Label Producing Apparatus and Operation Terminal>

Functional configurations of the label producing apparatus 1 and the operation terminal 300 will be described with reference to FIG. 4.

In FIG. 4, the label producing apparatus 1 includes the printing head 23 performing desired printing on the print-receiving tape 103, the print-head driving circuit 31 controlling and causing the printing head 23 to perform a print operation of desired print contents for the print-receiving tape 103, a transport roller motor 32 (hereinafter also simply referred to as a "motor") driving the platen roller 26, a transport roller driving circuit 33 controlling the transport roller motor 32, a movable blade sensor 34 detecting a state of completion of cutting of the label tape 109 with print including the print-receiving tape 103 by the movable blade 41, a temperature sensor 35 monitoring a temperature of, for example, a head, a motor, and a substrate, as first apparatus state information related to the label producing apparatus 1 to detect occurrence of an error such as a high temperature abnormality, a battery sensor 36 detecting a battery remaining amount also as the first apparatus state information related to the label producing apparatus 1, a tape remaining amount sensor 37 detecting a remaining amount of a tape (or a ribbon) as first medium state information of the print-receiving tape 103, a tape type sensor 38 detecting a tape type (such as a tape width and a tape color) as first medium attribute information of the print-receiving tape 103, a control circuit 140 (corresponding to a computer) controlling an overall operation of the label producing apparatus 1 via the print-head driving circuit 31, the transport roller driving circuit 35, etc., an operation part 141 including the keyboard 3 and the functional keys 4, a communication control part 142 performing a mutually-recognized communication including connection authentication through a known technique with the operation terminal 300, a display part 143, and a memory 144 consisting of a RAM and a ROM, for example. The ROM (corresponding to a recording medium) of the memory 144 stores a printing processing program for executing steps (processes) of a flow of FIG. 8 etc. described later. Additionally, the memory 144 stores, as first apparatus performance information related to the label producing apparatus 1, information of printing speed, resolution, etc. as well as performance level information such as a high performance different between an upper model and lower model etc.

The first apparatus state information (head/motor/substrate temperature/battery remaining amount) related to the label producing apparatus 1 and the first medium state information (tape/ribbon remaining amount) of the print-receiving tape 103 are classified as first state information. The first apparatus performance information (printing speed/resolution) related to the label producing apparatus 1 and the first medium attribute information (tape type) of the print-receiving tape 103 are classified as first performance/attribute information. Therefore, the temperature sensor 35, the tape remaining amount sensor 37, and the tape type sensor 38 described above are actually individually arranged in accordance with a detection target.

The multiple label producing apparatuses 1 each have the first apparatus state information and the first medium state information stored as the first state information, as well as the first apparatus performance information and the first medium attribute information stored as the first performance/attribute information, in the memory 144. Therefore, for example, when the multiple label producing apparatuses 1 include one of the label producing apparatuses 1 as an "own machine" and the other label producing apparatus 1 as an "other machine", the "first" corresponds to the "second" for the other machine. As a result, the control circuit 140 of the own machine can perform other machine determination step including a superiority/inferiority determination step of determining whether or not any other label producing apparatus 1 has a label producing condition (high performance+ good state) superior to the label producing apparatus 1 serving as the own machine (described later in detail).

The control circuit 140 displays on the display part 301 a user interface (hereinafter also simply abbreviated as "UI") menu for allowing a user to visually recognize and select multiple functions, setting items, etc. The display of the UI menu can include the case that a preliminary process of an operation before print is executed in each of the label producing apparatuses 1, which can be used for identifying whether or not the label producing apparatus 1 is in use.

The communication control part 142 includes constituent elements necessary for wireless communication such as an antenna and constitutes a communication device. The communication control part 142 performs the mutually-recognized communication including connection authentication through a known technique with the operation terminal 300 and also performs the mutually-recognized communications with the other label producing apparatuses 1 (e.g., label producing apparatuses 1B, 1C, 1X).

The control circuit 140 includes a printing control part 140A for performing controls of printing in a regular printing mode and printing in a continuous printing mode, and a notification control part 140B for controlling transmission of various notifications (described later) to the operating terminal 300.

The operation terminal 300 includes a CPU 303, a memory 304 consisting of, for example, a RAM and a ROM, the operation part 302, the display part 301, a mass storage device 305 consisting of a hard disk device etc. and storing various pieces of information, and a communication control part 306 controlling transmission/reception of information to/from the at least one of the label producing apparatus 1 through the mutually-recognized communication.

The CPU 303 executes a signal process in accordance with a program stored in advance in the ROM while using a temporary storage function of the RAM, thereby transmitting/receiving various instruction and information signals to/from the label producing apparatus 1.

As described above, the label producing apparatus 1 has the platen roller 26 feeding the print-receiving tape 103, the printing head 23 performing print on the print-receiving tape 103 fed by the platen roller 26, the communication control part 142, and the control circuit 140, and the control circuit 140 of the own machine executes: a reception start process of starting reception of second state information including second apparatus state information related to other machine and second medium state information of the corresponding print-receiving tape 103, as well as second performance/attribute information including second apparatus performance information related to the other machine and second medium attribute information of the corresponding print-receiving tape 103, broadcast-transmitted from the other machine through the communication control part 142; other machine determination process of determining whether or not any other machine is superior in label producing condition to the own machine on the basis of the second performance/attribute information of the other machine acquired through reception started in the reception start process, the first state information including the first apparatus state information related to the own machine and the first medium state information of the print-receiving tape 103, and the first performance/attribute information including the first apparatus performance information related to the own machine and the first medium attribute information of the print-receiving tape 103; and a transmission start process of disabling broadcast transmission of the first state information and the first performance/attribute information through the communication control part 142 if it is determined in the other machine determination process that any other machine is superior in label producing condition, and performing the broadcast transmission of the first state information and the first performance/attribute information through the communication control part 142 if it is determined in the other machine determination process that no other machine is superior in label producing condition (described in detail later).

In this case, as shown in FIG. 5, in a configuration in which the label producing apparatus 1 is operated by the operating terminal 300 through wireless communication, it is assumed that multiple (multiple types of) label producing apparatuses 1 (1A-1C, 1X) in a communication area wirelessly connectable to the operating terminal 300. In such a case, displaying all the label producing apparatuses 1 in a UI menu state on the display part 301 of the operating terminal 300 causes a problem that it is difficult for a user to quickly select the label producing apparatus 1 (1A-1C, 1X) to be connected. In the following description, in the drawings, the label producing apparatus 1 is simply referred to as "PRINTER" and the broadcast is simply referred to as "BC".

Therefore, as shown in FIG. 6, the control circuit 140 of each of the label producing apparatuses 1 activates a communication processing program to perform advertising. For example, in this embodiment, as shown in FIG. 7A, the control circuit 140 performs advertising of network management information of about 30 bytes from the own machine to other machine and waits for a connection request from the other machine. Alternatively, as shown in FIG. 7B, the control circuit 140 performs advertising of network management information of about 30 bytes from the own machine to other machine, receives an additional connection request from other machine that has not been connected to the network until now, performs advertising of network management information of about 30 bytes from the own machine to the other machine and waits for a connection request from the other machine. The network management information of about 30 bytes includes the above-described "state information", "performance/attribute information", "connection information", etc.

A control routine executed by the control circuit 140 of each of the label producing apparatuses 1 will be described with reference to the flowchart of FIG. 8. In the following description, it is assumed that the multiple label producing apparatuses 1 are present in a network area receivable for the operating terminal 300, and any one of the label producing apparatuses 1 is defined as the own machine (the printer 1A in the figures) while the label producing apparatuses 1 different from the own machine are defined as other machines (the printers 1B-1C, lx in the figures corresponding to patterns).

At step S1, when a connection request for printing (or pairing) is made from the operation terminal 300, the control circuit 140 of the own machine (e.g., the printer 1A of FIG. 9) sets a flag F indicative of a standby state (or a printable state) to "0" and goes to a process of step S2. It is noted that the flag F is set to "0" also when printing is not being performed according to a print request from another operation terminal 300.

At step S2, the control circuit 140 of the own machine executes a reception start step by starting reception of the network management information transmitted (sent) from other machine with the flag F=0 (e.g., the printer 1B of FIG. 9). In the case that other machine is present in this reception start step of step S2, the control circuit 140 of the own machine stores the received reception information of the other machine in the RAM etc. and then goes to a process of step S3.

Specifically, in the reception start step of step S2, the control circuit 140 of the label producing apparatus 1 serving as the own machine starts reception of the second state information including the second apparatus state information related to the other label producing apparatus 1 and the second medium state information of the corresponding print-receiving tape 103, as well as the second performance/attribute information including the second apparatus performance information related to the other label producing apparatus 1 and the second medium attribute information of the corresponding print-receiving tape 103, broadcast-transmitted from the other label producing apparatus 1 through the communication control part 142.

At step S3, the control circuit 140 of the own machine executes a detection step of determining whether or not other machine has a performance functionally equal to or higher than the own machine, for each of the other machines stored in the RAM etc. (a portion of the other machine determination step). Whether or not other machine is functionally equal to or higher than the own machine may simply be compared and determined by including, for example, the model numbers and the year models of the label producing apparatuses 1 for each manufacturer in the network management so that whether the apparatuses have the same performance or substantially the same performance is also taken into consideration. Alternatively, the control circuit 140 of the own machine may determine whether or not the other machine is functionally equal to or higher than the own machine based on whether or not the apparatus can deal with a print request from the operation terminal 300 (e.g., in terms of the number of types of fonts) or based on comparison of old and new driver versions. In the case of the label producing apparatus 1 (1A-1C, 1X) shown in FIG. 5, the label producing apparatuses 1A-1C are of the same model, and the label producing apparatus 1X is of a different model. In this case, the label producing apparatuses 1A-1C includes a keyboard etc. so that characters etc. can directly be input without using the operating terminal 300. In contrast, the label producing apparatus 1X does not include a keyboard etc. However, whether or not these keyboards are disposed may not be included in conditions for determining whether or not other machine is functionally equal to or higher than the own machine. Specifically, character input etc. for producing print data can be performed on the operation terminal 300 in which an application is activated. Therefore, whether or not characters can directly be input can be excluded from criteria for determining whether or not a machine is equal, or substantially equal, or higher. Alternatively, an apparatus may be included as an apparatus having substantially the same performance depending on a condition, for example, as in the case that the condition is limited only to a print of character data or in the case that the condition is limited only to an appearance size of an apparatus such as when the only difference is actually settable tape length (the type of the cartridge 8) rather than a tape remaining amount. If the control circuit 140 of the own machine determines that other machine equal to or higher than the own machine is present (Yes), the process goes to step S4. On the other hand, if the control circuit 140 of the own machine determines that other machine equal to or higher than the own machine is not present (No), the process goes to step S9.

In this way, in the detection step of step S3 that is a portion of the other machine determination step, the detection of the presence of the other label producing apparatus 1 (other machine) having a performance equal to or higher than the own machine is started on the basis of the second performance/attribute information of the other label producing apparatus 1 acquired due to the reception started in the reception start step (S2).

At step S4, the control circuit 140 of the own machine determines whether or not the own machine is being connected by a connection request from the operation terminal 300 operated by the user (that is not the other operation terminal 300 described above). If the control circuit 140 of the own machine determines that the own machine is being connected to the operation terminal 300 (Yes), the process goes to step S9. On the other hand, if the control circuit 140 of the own machine determines that the own machine is not being connected to the operation terminal 300 (No), the process goes to step S5.

At step S5, the control circuit 140 of the own machine executes the superiority/inferiority determination step of determining whether or not the other machine has a function etc. superior in performance to the own machine based on the reception information stored in the RAM etc. at step S2 (a portion of the other machine determination step). If the control circuit 140 of the own machine determines that the other machine has a function etc. superior in performance to the own machine (Yes), the process goes to step S6. On the other hand, if the control circuit 140 of the own machine determines that the other machine does not have a function etc. superior in performance to the own machine (No), the process goes to step S9.

In this way, in the superiority/inferiority determination step of step S5 that is a portion of the other machine judging step, the determination of superiority/inferiority is started in terms of the second state information related to the other label producing apparatus 1 acquired through reception from the other label producing apparatus 1 detected in the detection step (step S3) with respect to the first state information. Specifically, the control circuit 140 of the own machine determines whether or not any of the label producing apparatuses 1 defined as other machines has a label producing condition (high performance+good state) superior to the label producing apparatus 1 serving as the own machine by comparing the second state information including the second apparatus state information related to the other machine and the second medium state information of the corresponding print-receiving tape 103 as well as the second performance/attribute information including the second apparatus performance information related to the other machine and the second medium attribute information of the corresponding print-receiving tape 103, which are broadcast-transmitted from the other machines, on the basis of the first state information including the first apparatus state information related to the label producing apparatus 1 (error occurrence; UI menu state; head/motor/substrate temperature/battery remaining amount) and the first medium state information of the print-receiving tape 103 (tape/ribbon remaining amount) as well as the first performance/attribute information including the first apparatus performance information related to the label producing apparatus 1 (printing speed/resolution) and the first medium attribute information of the print-receiving tape 103 (tape type).

If it is determined that the other machine has a function etc. superior in performance to the own machine (Yes), the control circuit 140 of the own machine determines whether or not the flag F is "1" (step S6), and in the case that the flag F is "1", the control circuit 140 of the own machine disables (stops) the broadcast transmission (sending) of own machine information (step S7) and sets the flag F to "0" (step S8), and the process goes to step S2. In this case, the flag F is changed from "1" to "0" on the assumption that the own machine becomes superior in performance to the other machine due to a reduction in the battery remaining amount or the tape remaining amount attributable to consumption associated with execution of printing by other machine, for example. In this way, after setting the flag to "0" at step S8, the process can be returned to step S2 to detect the label producing apparatus 1 having a higher superiority in real time. In the case that the flag F is "0" at step S6, the process goes to step S2.

On the other hand, if it is determined that the other machine does not have a function etc. superior in performance to the own machine (No), the control circuit 140 of the own machine starts broadcast transmission (sending) of the own machine information for displaying the own machine on the UI menu (step S9) and then sets the flag F to "1" (step S10), and the process returns to step S2. In this case, the flag F is set to "1" on the assumption that the own machine becomes superior in performance to the other machine in terms of the battery remaining amount or the tape remaining amount due to consumption associated with execution of printing by the other operation terminal, for example.

Therefore, at steps S6-S10, if it is determined that any of the label producing apparatuses 1 has a superior label producing condition in the superiority/inferiority determination step of step S5, the control circuit 140 of the own machine does not start the broadcast transmission of the first state information and the first performance/attribute information through the communication control part 142 (step S7), and if it is determined that no other label producing apparatus 1 has a superior label producing condition in the superiority/inferiority determination step of step S5, the control circuit 140 of the own machine starts the broadcast transmission of the first state information and the first performance/attribute information through the communication control part 142 (step S9). Thus, the routine executed by the control circuit 140 at step S7 and step S9 is the transmission start step. Specifically, when the communication processing program is executed in each of the label producing apparatuses 1, the control circuit 140 executes the superiority/inferiority determination step of step S5 and the transmission start step of step S7 and step S9. Step S7 also serves as a transmission stop step of disabling (or stopping) the broadcast transmission due to the presence of the other label producing apparatus 1 having a higher superiority.

(In the Case that Two Other Machines are Present)

As described above, the label producing apparatus 1 of the own machine first searches for other machine having a performance equal to or higher than the own machine. If one or more other machines are present, the condition in the other machines (other machine information) is compared with the information of the own machine (step S5). In this case, for example, as a result of comparison of the tape remaining amount, if the tape remaining amount of the own machine is less than the tape remaining amount of the other machine, the broadcast transmission is disabled (or stopped) so as not to perform the advertising of the own machine. On the other hand, if the tape remaining amount of the own machine is greater than the tape remaining amount of the other machine, the broadcast transmission is started so as to perform (or continue) the advertising (step S7).

Therefore, in the superiority/inferiority determination step of step S5, the control circuit 140 determines, based on the state information (the first state information) and the performance/attribute information (the first performance/attribute information) of the label producing apparatus 1 defined as the own machine, whether or not any other label producing apparatus 1 defined as the other machine is superior in label producing condition to the own machine (=has the contents of the performance/attribute information equal to or higher than the own machine and the contents of the state information superior to the own machine). The first state information includes apparatus performance information indicative of apparatus performance (the first apparatus performance information. for example, printing speed, printing resolution), and medium attribute information indicative of the attribute of the print-receiving tape 103 to be used (the first medium attribute information. for example, the type of the print-receiving tape 103). The first performance/attribute information includes apparatus state information indicative of an apparatus state and medium state information indicative of a state of the print-receiving tape 103. The apparatus state information includes first apparatus state information, for example, a presence/absence of error occurrence and error contents at the time of error occurrence, a user interface (UI) setting state, an intra-apparatus temperature (temperature of the printing head 23, the transport roller motor 32, the substrate (not shown), etc.), and a battery remaining amount in the case of battery drive. The medium state information includes first medium state information, for example, a remaining amount of the print-receiving tape 103, and a remaining amount of an ink medium including an ink transferred to the print-receiving tape 103, etc.

If no other label producing apparatus 1 is superior in label producing condition to the own machine in the superiority/inferiority determination step of step S5, the transmission start step of step S9 is subsequently executed to start the broadcast transmission of the first state information and the first performance/attribute information through the communication control part 142. In contrast, if any other label producing apparatus 1 is superior in label producing condition to the own machine in the superiority/inferiority determination step of step S5, the transmission stop step of step S7 is subsequently executed to disable (stop) the broadcast transmission of the first state information and the first performance/attribute information through the communication control part 142.

When these steps are executed by, for example, the multiple label producing apparatuses 1 at the same time, the broadcast transmission is not performed by the label producing apparatus 1 serving as the own machine having at least one other machine superior in label producing condition to the own machine among the multiple label producing apparatuses 1, and the broadcast transmission is performed only by the one label producing apparatus 1 superior in label producing condition of the own machine to any other machines. As a result, the operation terminal 300 recognizes only the one label producing apparatus 1 performing the broadcast transmission (as a connectable apparatus).

Therefore, the problem of difficulty in selecting the label producing apparatus 1 to be connected as described above is solved, and wireless connection can easily be established for the one label producing apparatus 1.

In the superiority/inferiority determination step of step S5, as described above, various pieces of information can be included in the determination of whether or not the other machine has a function etc. superior in performance to the own machine, i.e., the determination of superiority, made by the control circuit 140 of the own machine.

Specifically, in addition to basic information (e.g., serial numbers of respective manufacturers and models for determining upper models etc. in the detection step of step S3), as shown in FIG. 10, the information stored in and broadcast-transmitted (sent) from the RAMs etc. of the own and other machines can include terminal connection information for connection to the operation terminal 300, apparatus state information and medium state information as the first state information, and apparatus performance information and medium attribute information as the first performance/attribute information. The first state information and the first performance/attribute information may be inversed in the order of the step for determining the superiority, and the broadcast transmission can be started when a determination result of the superiority is obtained from any condition comparison.

The apparatus state information can include various pieces of information of the presence/absence of error occurrence, error contents, a UI authentication state (including the flag=1 described above), an intra-apparatus temperature (head/motor. substrate, etc.), and a battery remaining amount.

The medium state information can include a tape remaining amount that is a remaining amount of the print-receiving tape 103 and an ink remaining amount that is a remaining amount of the ink ribbon 105.

Regarding conditions compared by the control circuit 140 of the own machine for the determination, the superiority is determined between the own machine and the other machine in terms of the occurrence of an error, a state of being connected to the other operation terminal 300 (flag F=1), a state of being used for direct printing using the operation part 302 (flag F=1), the intra-apparatus temperature (head/motor/board etc.), the battery remaining amount, the tape remaining amount, and the ribbon remaining amount, in descending order of priority.

The apparatus attribute information can include the printing speed and the resolution. In this case, for example, these conditions can be made unnecessary depending on contents of a print produced by the operation terminal 300, the apparatus attribute information is lower than the apparatus state information in determination criteria of the superiority.

The medium attribute information can include the type (tape width, tape color, kind) of the pint-receiving medium (the cartridge 8), etc. It is noted that the kind in this case includes, for example, non-fixed length/die-cut, receptor, laminate etc. In this regard, for example, in the case that the cartridges 8 of the same tape width and the same tape color are mounted in a network area, or in the case that the tape color is not designated by user setting, these conditions can be made unnecessary depending on contents of a print produced by the operation terminal 300, and therefore, the apparatus attribute information is lower than the medium state information in determination criteria of the superiority.

Therefore, regarding the determination of the superiority described above, for example, as shown in FIG. 9, it is assumed that the tape remaining amount of the print-receiving tape 103 in the cartridge 8 is 100 m and 5 m in the label producing apparatus 1A and the label producing apparatus 1B, respectively, which are the two apparatuses present in the communication range of the operation terminal 300 (the label producing apparatuses 1A, 1B are also in a communicable range of each other). In this case, the label producing apparatuses 1A, 1B each sequentially execute the flow to exchange information through broadcast transmission (advertising), and the label producing apparatus 1A recognizes itself as having a superior condition and continues the broadcast transmission, while the label producing apparatus 1B recognizing itself as being inferior backs away and stops the broadcast transmission.

As a result, the label producing apparatus 1B is not displayed on the operation terminal 300, while only the label producing apparatus 1A is visually displayed at the UI menu display, so that the user can connect the label producing apparatus 1A without hesitation at this timing.

(When Other Machine is Newly Added)

It is also conceivable that as shown in FIG. 11, for example, other machine (the label producing apparatus 1C) is newly added to the state of one other machine as shown in FIG. 9, i.e., one machine is added from the middle rather than the three label producing apparatuses 1 (1A, 1B, 1C) being present in the network area from the start.

In such a case, since the label producing apparatus 1A serving as the own machine and the label producing apparatus 1B serving as the other machine has a relationship in which the own machine has higher superiority, only the label producing apparatus 1A acquires the other machine information from the label producing apparatus 1C serving as the new other machine and determines the superiority. In the case that the label producing apparatus 1B serving as the other machine is determined as having a higher superiority in the state shown in FIG. 9, the label producing apparatus 1A serving the own machine does nothing, and the superiority is determined between the label producing apparatus 1B that is the other machine and the label producing apparatus 1C that is the new other machine. It is noted that the advertising to be performed may be directed to all of the label producing apparatus 1A that is the own machine, the label producing apparatus 1B that is the other machine, and the label producing apparatus 1C that is the new other machine.

As described above, in the case that the label producing apparatus 1C having the tape remaining amount of 200 m is the new other machine, the label producing apparatus 1A and the label producing apparatus 1C each sequentially execute the flow to exchange information through broadcast transmission (advertising), and the label producing apparatus 1C recognizes itself as having a most superior condition higher than the label producing apparatus 1A and continues the broadcast transmission, while the label producing apparatus 1A recognizing itself as being inferior to the label producing apparatus 1C backs away and stops the broadcast transmission (the label producing apparatus 1B is continuously in a transmission stop state).

As a result, only the label producing apparatus 1C is visible on the operating terminal 300, so that the user can connect the label producing apparatus 1C without hesitation at this timing.

(In the Case that Superiority is Inversed Due to Use)

It is also conceivable that as shown in FIG. 12, as a result of performing a print by using the label producing apparatus 1C in the state shown in FIG. 11 (the state shown in FIG. 9 is also available), the superiority of the label producing apparatuses 1A, 1B becomes higher than the label producing apparatus 1C.

This example corresponds to the case that the tape remaining amount of the label producing apparatus 1C is reduced from 200 m to 80 m at one time due to label production by a manual operation etc. without using wireless communication. In this example, it is assumed that the determination of step S4 is No since the apparatus is used stand-alone without being connected to any of the operation terminals 300. In such a case, the label producing apparatuses 1A, 1B, 1C each sequentially execute the flow to exchange information through broadcast transmission (advertising), and the label producing apparatus 1A becomes superior in condition again continuously performs the broadcast transmission (resumes the transmission), while the label producing apparatus 1C is no longer superior to the label producing apparatus 1A and stops the broadcast transmission. The label producing apparatus 1B serving as the other machine is continuously in the transmission stop state.

As a result, only the label producing apparatus 1A is visible on the operating terminal 300, so that the user can connect the label producing apparatus 1A without hesitation at this timing.

(In the Case that Own Machine Etc. Go Out of Area)

It is also conceivable that as shown in FIG. 13, any one or more of the label producing apparatus 1A and the label producing apparatus 1B (and the new label producing apparatus 1C) go out of the network area from the state shown in FIG. 11 (or FIG. 12) due to movement, power-off (including dead battery), etc.

This case corresponds to the case that, for example, the label producing apparatus 1A is powered off while the label producing apparatus 1B is taken out from the network area. In this case, the remaining label producing apparatus 1C can recognize that the other label producing apparatuses 1A, 1B are gone from the absence (discontinuance) of reception in response to the broadcast transmission from the label producing apparatus 1C. Therefore, the label producing apparatus 1C continuously performs the broadcast transmission. In this way, the broadcast transmission can be resumed when the other machines equivalent in performance are gone. As a result, only the label producing apparatus 1C is present in the network area again on the operation terminal 300, so that the user can connect the label producing apparatus 1C without hesitation at this timing.

(Excluding Connected Label Producing Apparatus from Comparison Objects)

As shown in FIG. 14, in the case that the label producing apparatus 1A and the label producing apparatus 1B each sequentially execute the flow to perform the broadcast transmission when the two existing apparatuses are the label producing apparatus 1A having the remaining amount of 100 m and the label producing apparatus 1B having the remaining amount of 5 m and the label producing apparatus 1A is already connected to the operation terminal 300, the partner label producing apparatus 1A is already connected to the other operation terminal 300 (e.g., during printing/in use) from the viewpoint of the label producing apparatus 1B and therefore is not included in objects of comparison of the condition as described above. Therefore, the label producing apparatus 1A superior to the label producing apparatus 1B does not exist in a comparable range in the network area, so that the label producing apparatus 1B can continuously perform the broadcast transmission to the operation terminal 300. As a result, the label producing apparatus 1B is visible on the different operation terminal 300 (not connected to the label producing apparatus 1A), and the user can connect the label producing apparatus 1B.

(In the Case that Label Producing Apparatuses of Different Models are Present)

On the other hand, it is also conceivable that as shown in FIG. 15, the label producing apparatus 1A and the label printer 1B having the same performance as the label producing apparatus 1A are present along with the label producing apparatus 1X of a model different from the label producing apparatuses 1A, 1B.

In such a case, first, in the relationship between the label producing apparatus 1A and the label producing apparatus 1B of the same model, when the label producing apparatus 1A having the tape remaining amount of 200 m sequentially executes the flow to exchange information through broadcast transmission (advertising), the label producing apparatus 1A is superior to the label producing apparatus 1B, so that only the label producing apparatus 1A starts the broadcast transmission, while the label producing apparatus 1B disables the broadcast transmission.

On the other hand, regarding the label producing apparatus 1X, the label producing apparatus 1A and the label producing apparatus 1B are different in model from the own machine and therefore not included in objects of comparison of the condition as described above. Thus, no other machine superior to the own machine is present in the comparable range, and therefore, the label producing apparatus 1X continuously performs the broadcast transmission, i.e., "the transmission is continued if no other machine has the same condition".

As a result, the operation terminal 300 displays the label producing apparatus 1A and the label producing apparatus 1X on the UI menu in the display part 302, so that the user can connect the label producing apparatus 1A or the label producing apparatus 1X) at this timing. In this example, when both the label producing apparatus 1A and the label producing apparatus 1X are displayed on the UI menu in the display part 302, the label producing apparatus 1X is an upper model having a higher superiority and is displayed on the upper side.

(Summary)

As described above, the communication processing program of the label producing apparatus 1 in each of the embodiments has the feeding roller driving shaft 108 feeding the print-receiving tape 103, the printing head 23 performing print on the print-receiving tape 103 fed by the feeding roller driving shaft 108, the communication control part 142, and the control circuit 140, and causes the control circuit 140 of the label producing apparatus 1 operated by the operation terminal 300 through wireless communication via the communication control part 142 to produce the print label L to execute: the reception start step (step S2) of starting reception of the second state information including the second apparatus state information related to the other label producing apparatus 1 and the second medium state information of the corresponding print-receiving tape 103, as well as the second performance/attribute information including the second apparatus performance information related to the other label producing apparatus 1 and the second medium attribute information of the corresponding print-receiving tape 103, broadcast-transmitted from the other label producing apparatus 1 through the communication control part 142; the other machine determination step (step S3, step S5) of determining whether or not any other label producing apparatus 1 is superior in label producing condition (high performance+good state) to the label producing apparatus 1 on the basis of the second performance/ attribute information of the other label producing apparatus 1 acquired through reception started in the reception start step (step S2), the first state information including the first apparatus state information related to the label producing apparatus 1 (error occurrence; UI menu state; head/motor/ substrate temperature/battery remaining amount) and the first medium state information of the print-receiving tape 103 (tape/ribbon remaining amount) as well as the first performance/attribute information including the first apparatus performance information related to the label producing apparatus 1 (printing speed/resolution) and the first medium attribute information of the print-receiving tape 103 (tape type); and the transmission start step (step S7, step S9) of disabling broadcast transmission of the first state information and the first performance/attribute information through the communication control part 142 if it is determined in the other machine determination step (step S3, step S5) that any other label producing apparatus 1 is superior in label producing condition, and performing the broadcast transmission of the first state information and the first performance/ attribute information through the communication control part 142 if it is determined in the other machine determination step (step S3, step S5) that no other label producing apparatus 1 is superior in label producing condition.

Therefore, in the case that the multiple label producing apparatuses 1 are wirelessly connectable to the operation terminal 300 in the configuration in which any of the label producing apparatuses 1 is operated by the operation terminal 300 through wireless communication, it is difficult to quickly select the label producing apparatus 1 to be connected.

Therefore, when the communication processing program is executed in the label producing apparatuses 1, the reception start step (step S2), the other machine determination step (step S3, step S5), and the transmission start step (step S7, step S9) are performed.

The reception start step (step S2) includes starting reception of the state information (the second state information. including the second apparatus state information and the second medium state information as described above) and the performance/attribute information (the second performance/attribute information. including the second apparatus performance information and the second medium attribute information as described above) broadcast-transmitted from other machine.

Subsequently, in the other machine determination step (step S3, step S5) after the reception start step (step S2), it is determined, on the basis of comparison of the received second state information and second performance/attribute information with the state information (the first state information) and the performance/attribute information (the first performance/attribute information) of the label producing apparatus 1 (hereinafter appropriately referred to as "own machine"), whether or not any other label producing apparatus 1 is superior in label producing condition to the own machine (=has the contents of the performance/attribute information equal to or higher than the own machine and the contents of the state information superior to the own machine). The first state information includes the apparatus performance information indicative of apparatus performance (the first apparatus performance information. for example, printing speed, printing resolution), and medium attribute information indicative of the attribute of the print-receiving tape 103 to be used (the first medium attribute information. for example, the type of the print-receiving tape 103). The first performance/attribute information includes the apparatus state information indicative of a apparatus state (the first apparatus state information. for example, the presence/absence of error occurrence and the error contents at the time of error occurrence, a user interface setting state, an intra-apparatus temperature, the battery remaining amount in the case of battery drive), and the medium state information indicative of a state of the print-receiving tape 103 (the first medium state information. the remaining amount of the print-receiving tape 103, a remaining amount of the ink ribbon 105 including the ink transferred to the print-receiving tape 103, etc.).

If no other label producing apparatus 1 is superior in label producing condition to the own machine in the other machine determination step (step S3, step S5), the transmission start step (step S7, step S9) is subsequently executed to perform the broadcast transmission of the first state information and the first performance/attribute information through the communication control part 142. In contrast, if any other label producing apparatus 1 is superior in label producing condition to the own machine, the broadcast transmission of the first state information and the first performance/attribute information through the communication control part 142 is not performed (is disabled).

When these steps are executed by, for example, the multiple label producing apparatuses 1 at the same time, the broadcast transmission is not performed (is disabled) by the label producing apparatus 1 having at least one other machine superior in label producing condition to the own machine among the multiple label producing apparatuses 1, and the broadcast transmission is performed only by the one label producing apparatus 1 superior in label producing condition of the own machine to any other machines. As a result, the operation terminal 300 recognizes only the one label producing apparatus 1 performing the broadcast transmission (as a connectable apparatus).

In the communication processing program of the label producing apparatus 1, the other machine determination step (step S3, step S5) includes executing the detection step (step S3) of starting detection of the presence of the other label producing apparatus 1 having a performance equal to or higher than the label producing apparatus 1 on the basis of the second performance/attribute information of the other label producing apparatus 1 acquired through the reception started in the reception start step (step S2), and the superiority/inferiority determination step (step S5) of starting determination of the superiority/inferiority of the second state information related to the other label producing apparatus 1 acquired through the reception from the other label producing apparatus 1 detected in the detection step (step S3) with respect to the first state information.

The transmission start step (step S7, step S9) includes disabling the broadcast transmission of the first state information and the first performance/attribute information in the case that the contents of the second state information related to the other label producing apparatus 1 is determined as being superior to the contents of the first state information in the superiority/inferiority determination step (step S5).

In this way, after the reception start step (step S2), the label producing apparatuses 1 execute the detection step (step S3) and the superiority/inferiority determination step (step S5) included in the other machine determination step (step S3, step S5). Specifically, the detection step (step S3) includes starting detection of whether or not any other machine has a performance equal to or higher than the own machine, based on the second performance/attribute information acquired through the reception.

If any other machine has a performance equal to or higher than the own machine, the superiority/inferiority determination step (step S5) is subsequently executed to compare the second state information related to the other machine and the first state information related to the own machine to start determining superiority/inferiority between the second state information and the first state information (in other words, determining whether various states related to the other machine are superior to various states related to the own machine).

In the case that the contents of the second state information are superior to the contents of the first state information (in other words, the various states related to the other machine are superior to the various states related to the own machine), the broadcast transmission of the first state information and the first performance/attribute information is not performed in the transmission start step (step S7, step S9).

When these steps are executed by, for example, the multiple label producing apparatuses 1 at the same time, each of the label producing apparatus 1 disables the broadcast transmission in the case that even one other machine has the apparatus performance/medium attribute equal to or higher than the own machine and various states superior to the own machine. As a result, finally, among the multiple label producing apparatuses 1 having apparatus performance/medium attribute similar to each other existing at a certain point of time, the only one most favorable label producing apparatus 1 in terms of the various states performs the broadcast transmission.

Furthermore, in the communication processing program of the label producing apparatus 1, the transmission start step (step S7, step S9) includes performing broadcast transmission of the first state information and the first performance/attribute information in the case that the presence of the other label producing apparatus 1 having a performance equal to or higher than the label producing apparatus 1 is no longer detected in the detection step (step S3) newly after the broadcast transmission of the first state information and the first performance/attribute information is disabled.

As a result, in the case that although the other machine having apparatus performance/medium attribute similar to the own machine and superior in various states to the own machine was initially present in a usable manner, the other machine having apparatus performance/medium attribute similar to the own machine is subsequently no longer present in a usable manner (such as when the other machine initially present is used), the own machine is reliably recognized by the operation terminal 300.

In the communication processing program of the label producing apparatus 1, the transmission start step (step S7, step S9) includes performing broadcast transmission of the first state information and the first performance/attribute information in the case that the second state information related to the other label producing apparatus 1 is determined as not being superior to the first state information in the superiority/inferiority determination step (step S5) newly after the broadcast transmission of the first state information and the first performance/attribute information is disabled.

As a result, in the case that although the other machine superior in various states to the own machine was initially present in a usable manner, the other machine superior in various states to the own machine is subsequently no longer present in a usable manner (such as when the other machine is used or when the other machine deteriorates in various states), the own machine is reliably recognized by the operation terminal 300.

In the communication processing program of the label producing apparatus 1, the other machine determination step (step S3, step S5) includes the detection step (step S3) of starting detection of the presence of the other label producing apparatus 1 having a performance equal to or higher than the label producing apparatus 1 on the basis of the second performance/attribute information of the other label producing apparatus 1 acquired through the reception started in the reception start step (step S2), and the transmission start step (steps S7, step S9) includes performing broadcast transmission of the first state information and the first performance/attribute information regardless of the contents of the first state information in the case that the presence of the other label producing apparatus 1 having a performance equal to or higher than the label producing apparatus 1 is not detected in the detection step (step S3).

In this way, the label producing apparatuses 1 execute the detection step (step S3) included in the other machine determination step (step S3, step S5) after the reception start step (step S2) described above. Specifically, the detection step (step S3) includes starting detection of whether or not any other machine has a performance equal to or higher than the own machine, based on the second performance/attribute information acquired through the reception. In the case that such other machine does not exist, the first state information and the first performance/attribute information are broadcast-transmitted regardless of the contents of the first state information. As a result, in the case that none of the other label producing apparatuses 1 has apparatus performance/medium attributes similar to the own machine, the own machine is reliably be recognized by the operation terminal 300.

In the communication processing program of the label producing apparatus 1, the transmission start step (step S7, step S9) further includes performing broadcast transmission of connection information indicative of whether or not the label producing apparatus 1 is connected to the operation terminal 300, the reception start step (step S2) further includes starting reception of the connection information broadcast-transmitted from the other label producing apparatus 1, and the other machine determination step (step S3, step S5) includes excluding the other label producing apparatus 1 from comparison objects in the case that the connection information of the other label producing apparatus 1 acquired through the reception started in the reception start step (step S2) indicates a state of connection with the operation terminal 300.

As a result, by excluding the other machine already connected and used, the optimum label producing apparatus 1 to be connected is reliably recognized by the operating terminal 300.

Furthermore, in the communication processing program of the label producing apparatus 1, the first apparatus state information and the second apparatus state information include at least one of the presence/absence of error occurrence and the error contents at the time of error occurrence, a user interface setting state (whether or not stand-alone setting is enabled), an intra-apparatus temperature (head/monitor/substrate temperature), and a battery remaining amount in the case of battery drive, and the first medium state information and the second medium state information include at least one of a remaining amount of the print-receiving tape 103 and a remaining amount of the ink ribbon 105 including the ink transferred to the print-receiving tape 103.

In the communication processing program of the label producing apparatus 1, the first apparatus performance information and the second apparatus performance information include at least one of the printing speed and the printing resolution performed by the feeding roller driving shaft 108 and the printing head 23, and the first medium attribute information and the second medium attribute information include the type (specifically, width, color, non-fixed length/die-cut, receptor, laminate, etc.) of the print-receiving tape 103 (tape).

As described above, since the condition of the superiority changes from moment to moment (such as when the condition of the superiority such as a tape remaining amount and a battery remaining amount is inversed with respect to the other machine due to consumption of the tape and electric power associated with usage), the connection can be switched as needed. For example, the control circuit 140 determines whether the tape remaining amount (or battery remaining amount) of the own machine is sufficient for the remaining amount of unprocessed (unprinted) print data, and if the control circuit 140 determines that the remaining amount is sufficient (Yes determination), the own machine continues the process even though the superiority is inversed. On the other hand, if the control circuit 140 determines that the remaining amount is not sufficient (No determination), a message is sent to the operation terminal 300 to indicate that the tape runs out during print, and the model selection can then be performed again to switch the apparatus at convenient timing. A message may be sent in advance before printing to indicate that switching is required.

Furthermore, the superiority can be determined in advance between apparatuses by using IoT etc., and in the case that a predetermined condition is not satisfied (e.g., the tape remaining amount or the battery remaining amount is almost zero), an apparatus may not start (may refrain from) establishing connection on the assumption that a superior apparatus is present.

What is claimed is:

1. A non-transitory computer-readable recording medium storing a communication processing program of a label producing apparatus for executing steps on a computer of the label producing apparatus, said label producing apparatus including a feeder configured to feed a print-receiving medium, a printing head configured to perform printing on said print-receiving medium fed by said feeder, a communication device, and said computer, said label producing apparatus configured to be operated by an operation terminal through wireless communication via said communication device to produce a print label, wherein said steps, when executed by the computer, comprising:
   a reception start step for starting reception of second state information and second performance/attribute information that are broadcast-transmitted from another label producing apparatus through said communication device, the second state information including second apparatus state information related to the other label producing apparatus and second medium state information of a corresponding print-receiving medium, the second performance/attribute information including second apparatus performance information related to the other label producing apparatus and second medium attribute information of said corresponding print-receiving medium;
   machine determination step for determining whether or not any other label producing apparatus superior with respect to a label producing condition to said label producing apparatus is present, based on said second performance/attribute information of said other label producing apparatus, first state information, and first performance/attribute information, the second performance/attribute information being acquired through said reception started in said reception start step, the first state information including first apparatus state information related to said label producing apparatus and first medium state information of said print-receiving medium, the first performance/attribute information including first apparatus performance information related to said label producing apparatus and first medium attribute information of said print-receiving medium; and
   a transmission start step for,
      in a case it is determined in said machine determination step that any other label producing apparatus superior with respect to the label producing condition is present, disabling broadcast transmission of the first state information and said first performance/attribute information through said communication device, and
      in a case that it is determined in said machine determination step that no other label producing apparatus superior with respect to the label producing condition is present, performing said broadcast transmission of the first state information and said first performance/attribute information through said communication device.

2. The recording medium according to claim 1, wherein said machine determination step includes:
   a detection step for detecting a presence of said other label producing apparatus having a performance equal to or higher than said label producing apparatus based on said second performance/attribute information of said other label producing apparatus acquired through said reception started in said reception start step, and
   a superiority/inferiority determination step for determining superiority/inferiority of the second state information related to said other label producing apparatus acquired through said reception from said other label producing apparatus detected in said detection step with respect to the first state information, and wherein
   in said transmission start step, in a case that it is determined in said superiority/inferiority determination step that contents of the second state information related to said other label producing apparatus are superior to contents of the first state information, not performing said broadcast transmission of the first state information and said first performance/attribute information.

3. The recording medium according to claim 2, wherein in said transmission start step, in a case that the presence of said other label producing apparatus having a performance equal to or higher than said label producing apparatus is no longer detected in said detection step after said broadcast transmission of the first state information and said first performance/attribute information is not performed, starting a new broadcast transmission of the first state information and said first performance/attribute information.

4. The recording medium according to claim 2, wherein in said transmission start step, in a case that it is determined in said superiority/inferiority determination step that the second state information related to said other label producing apparatus is determined as not being superior to the first state information after said broadcast transmission of the first state information and said first performance/attribute information is not performed, starting a new broadcast transmission of the first state information and said first performance/attribute information.

5. The recording medium according to claim 1, wherein said machine determination step includes
a detection step for detecting presence of said other label producing apparatus having a performance equal to or higher than said label producing apparatus based on said second performance/attribute information of said other label producing apparatus acquired through said reception started in said reception start step, and wherein
in said transmission start step, in a case that the presence of said other label producing apparatus having a performance equal to or higher than said label producing apparatus is not detected in said detection step, said broadcast transmission of the first state information and said first performance/attribute information is performed regardless of contents of the first state information.

6. The recording medium according to claim 1, wherein
in said transmission start step, performing broadcast transmission of connection information indicative of whether or not said label producing apparatus is connected to said operation terminal, wherein
in said reception start step, starting reception of said connection information broadcast-transmitted from said other label producing apparatus, and wherein
in said machine determination step, in the case that said connection information of said other label producing apparatus acquired through said reception started in said reception start step indicates a state of connection with said operation terminal, said other label producing apparatus is excluded from comparison objects.

7. The recording medium according to claim 1, wherein each of said first apparatus state information and said second apparatus state information includes at least one of presence/absence of error occurrence and error contents at a time of error occurrence, a user interface setting state, an intra-apparatus temperature, and a battery remaining amount in a case of battery drive.

8. The recording medium according to claim 1, wherein each of said first medium state information and said second medium state information includes at least one of a remaining amount of said print-receiving medium and a remaining amount of an ink medium including an ink transferred to said print-receiving medium.

9. The recording medium according to claim 1, wherein each of said first apparatus performance information and said second apparatus performance information includes at least one of a printing speed and a printing resolution performed by said feeder and said printing head.

10. The recording medium according to claim 1, wherein each of said first medium attribute information and said second medium attribute information includes a type of said print-receiving medium.

11. A label producing apparatus comprising:
a feeder configured to feed a print-receiving medium;
a printing head configured to perform printing on said print-receiving medium fed by said feeder;
a communication device configured to perform wireless communication; and
a controller,
wherein the label producing apparatus configured to be operated by an operation terminal to produce a print label, and
wherein the controller is configured to execute:
a reception start process for starting reception of second state information and second performance/attribute information that are broadcast-transmitted from another label producing apparatus through said communication device, the second state information including second apparatus state information related to the other label producing apparatus and second medium state information of a corresponding print-receiving medium, the second performance/attribute information including second apparatus performance information related to the other label producing apparatus and second medium attribute information of said corresponding print-receiving medium;
machine determination process for determining whether or not any other label producing apparatus superior with respect to a label producing condition to said label producing apparatus is present, based on said second performance/attribute information of said other label producing apparatus, first state information, and first performance/attribute information, the second performance/attribute information being acquired through said reception started in said reception start process, the first state information including first apparatus state information related to said label producing apparatus and first medium state information of said print-receiving medium, the first performance/attribute information including first apparatus performance information related to said label producing apparatus and first medium attribute information of said print-receiving medium; and
a transmission start process for,
in a case that it is determined in said machine determination process that any other label producing apparatus superior with respect to the label producing condition is present, disabling broadcast transmission of the first state information and said first performance/attribute information through said communication device, and
in a case that it is determined in said machine determination process that no other label producing apparatus superior with respect to the label producing condition is present, performing said broadcast transmission of the first state information and said first performance/attribute information through said communication device.

* * * * *